(12) United States Patent
Toyama et al.

(10) Patent No.: US 8,464,020 B2
(45) Date of Patent: Jun. 11, 2013

(54) NON-VOLATILE STORAGE DEVICE, HOST DEVICE, STORAGE SYSTEM, DATA COMMUNICATION METHOD AND PROGRAM

(75) Inventors: Masayuki Toyama, Osaka (JP); Tadashi Ono, Osaka (JP); Shinichiro Nishioka, Osaka (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 13/144,594

(22) PCT Filed: Dec. 1, 2010

(86) PCT No.: PCT/JP2010/007007
§ 371 (c)(1),
(2), (4) Date: Jul. 14, 2011

(87) PCT Pub. No.: WO2011/070747
PCT Pub. Date: Jun. 16, 2011

(65) Prior Publication Data
US 2011/0276748 A1    Nov. 10, 2011

(30) Foreign Application Priority Data

Dec. 7, 2009 (JP) ................................. 2009-277277

(51) Int. Cl.
*G06F 13/00* (2006.01)
(52) U.S. Cl.
USPC ................ 711/173; 711/103; 710/10; 710/38
(58) Field of Classification Search
None
See application file for complete search history.

(56) References Cited

U.S. PATENT DOCUMENTS

| | | | |
|---|---|---|---|
| 7,149,864 B2 * | 12/2006 | Braun et al. | 711/170 |
| 7,234,052 B2 * | 6/2007 | Lee et al. | 713/2 |
| 2006/0253661 A1 * | 11/2006 | Bass et al. | 711/154 |
| 2007/0168652 A1 | 7/2007 | Mylly et al. | |
| 2007/0192529 A1 * | 8/2007 | Roh et al. | 711/100 |

(Continued)

FOREIGN PATENT DOCUMENTS

| | | |
|---|---|---|
| JP | 2009-524139 | 6/2009 |
| JP | 2010-140266 | 6/2010 |
| WO | 2009/016832 A1 | 2/2009 |
| WO | 2010/067901 A1 | 6/2010 |

OTHER PUBLICATIONS

International Search Report for corresponding International Application No. PCT/JP2010/007007 mailed Feb. 22, 2011.

*Primary Examiner* — Edward Dudek, Jr.
*Assistant Examiner* — Sean D Rossiter
(74) *Attorney, Agent, or Firm* — Renner, Otto, Boisselle & Sklar, LLP

(57) ABSTRACT

In a memory system including a host device and one or more nonvolatile memory devices, the host device reads, from a nonvolatile memory device connected in the system, a boot code used to operate a CPU of the host device before the CPU is activated. The boot code reading process is required to be performed with a simple method. A host device (2) transmits a first symbol including a synchronous code to a nonvolatile memory device (1). The nonvolatile memory device (1) receives the first symbol from the host device (2), and transmits a first symbol that is identical to the received first symbol to the host device (2), and then transmits a boot code to the host device (2). In this manner, the host device (2) reads a boot code from the nonvolatile memory device 1 with a simple method.

19 Claims, 15 Drawing Sheets

U.S. PATENT DOCUMENTS

| | | |
|---|---|---|
| 2007/0211559 A1 | 9/2007 | Choi et al. |
| 2007/0277027 A1 | 11/2007 | Kim et al. |
| 2008/0072031 A1 | 3/2008 | Choi |
| 2008/0155207 A1* | 6/2008 | Eilert et al. .................. 711/154 |
| 2008/0229090 A1 | 9/2008 | Choi et al. |
| 2009/0113138 A1* | 4/2009 | Bass et al. .................... 711/144 |
| 2010/0169558 A1* | 7/2010 | Honda et al. .................. 711/103 |

* cited by examiner (a)

(b)

NON-VOLATILE STORAGE DEVICE, HOST DEVICE, STORAGE SYSTEM, DATA COMMUNICATION METHOD AND PROGRAM

TECHNICAL FIELD

The present invention relates to a memory system (storage system) including a host device and one or more non-volatile memory devices (non-volatile storage devices) in which the nonvolatile memory devices write and/or read data in response to an instruction transmitted from the host device, and more particularly, to a method with which the host device reads a boot code stored in the nonvolatile memory devices.

BACKGROUND ART

In a conventional memory system in which a host device and one or more nonvolatile memory devices are connected to each other, the host device generates commands and the nonvolatile memory devices perform various communication processes in response to the commands. When this memory system is booted, the host device is required to read a program for boot-up, which is called a boot code, from the nonvolatile memory devices connected in the system. Although the boot code has conventionally been stored in a NOR flash memory, the code is now often stored in a NAND flash memory or a nonvolatile memory device including a NAND flash memory, which tends toward a larger capacity and a lower cost. The boot code is then read from the NAND flash memory or the nonvolatile memory device including the NAND flash memory when the system is booted. Data is typically read from or written to the NAND flash memory or the nonvolatile memory device including the NAND flash memory using commands. The process of reading the boot code needs to be performed during system start-up when software is not yet activated. The memory system thus needs the simplest method to read the boot code.

For example, Patent Literature 1 describes a technique for reading, during boot-up, a boot code from a device having an SD/MMC interface using a signal line for a command defined by the SD/MMC interface.

CITATION LIST

Patent Literature

Patent Literature 1: Published Japanese translation No. 2009-524139

SUMMARY

Technical Problem

A host device tends to have a larger number of terminals. A memory system including a host device is now required to prevent the number of terminals of the host device from increasing any further. To prevent the number of terminals of the host device from increasing, the memory system may use a chain topology, a ring topology, or a hub topology to connect a plurality of devices including nonvolatile memory devices. In addition to such nonvolatile memory devices, various network devices including wireless LAN devices and I/O devices are connected to this system. As the memory system is required to process a larger amount of data and to transfer data at a higher bit rate, the memory system tends to use a differential signaling serial transmission interface to transmit and receive data between the host device and the nonvolatile memory devices, instead of using a conventional single ended transmission interface.

However, the conventional technique described in Patent Literature 1 uses an SD/MMC interface, with which a plurality of devices cannot be connected. The conventional technique is not intended for processes associated with data transfer performed by differential signaling serial transmission. For example, the technique is not intended for processes such as activating a differential signaling serial transmission interface and synchronizing data to be received and clock signals. Therefore, the conventional technique is not applicable to a memory system in which a host device having a high-speed interface and a plurality of nonvolatile memory devices are connected to each other.

To solve the above problems, it is an object of the present invention to provide a memory system including a host device and one or more nonvolatile memory devices in which the host device reads a boot code from the nonvolatile memory devices with a simple method, a nonvolatile memory device forming such a memory system, and a host device forming such a memory system.

Solution to Problem

A first aspect of the present invention provides a nonvolatile memory device that transmits and receives data to and from a host device. The nonvolatile memory device includes one or more nonvolatile memories and a controller unit.

The controller unit controls reading and/or writing of data to and from the nonvolatile memories.

The controller unit includes a host interface unit and a memory control unit.

The memory control unit reads a boot code of the host device from the nonvolatile memories.

The host interface unit operates in the manner described below.

(1) When receiving, from the host device, an interface activating signal that is a signal carrying an instruction to activate an interface, the host interface unit transmits an interface activating signal that is identical to the received interface activating signal to the host device.

(2) When receiving, from the host device, a first symbol carrying an instruction to read the boot code after transmitting the interface activating signal to the host device, the host interface unit transmits a first symbol that is identical to the received first symbol to the host device.

(3) After transmitting the first symbol to the host device, the host interface unit outputs the boot code that is read by the memory control unit to the host device.

In any of the interface activating process and the boot code reading process, this nonvolatile memory device is simply required to transmit, to the host device, a signal identical to the signal transmitted from the host device. Transmitting such a signal to the host device starts the interface activating process and the boot code reading process in a simple and appropriate manner. In a memory system in which a plurality of nonvolatile memory devices are connected to a host device, each nonvolatile memory device is simply required to perform the same processing as described above to start the interface activating process and the boot code reading process in a simple and appropriate manner.

The use of this nonvolatile memory device in a memory system including a host device and one or more nonvolatile memory devices enables the interface activating process and the boot code reading process to be performed in a simple and appropriate manner.

The interface activating signal is a signal for performing the interface activating process of the nonvolatile memory device. Upon receiving the interface activating signal, the nonvolatile memory device performs the interface activating process. As a result, the nonvolatile memory device enters a state in which the device can perform data communication with an external unit (for example, the host device or with other nonvolatile memory devices).

The identical signals (or symbols) are signals (or symbols) carrying the same logical information. For example, when the first symbol consists of a synchronous code and a boot request code, a symbol identical to the first symbol is a symbol consisting of a synchronous code and a boot request code identical to the synchronous code and the boot request code of the first symbol.

A second aspect of the present invention provides the nonvolatile memory device of the first aspect of the present invention in which when receiving the first symbol from the host device, the host interface unit transmits a synchronous symbol that is identical to or differs from the received first symbol to the host device, and when receiving an idle symbol from the host device after transmitting the synchronous symbol, the host interface unit transmits an idle symbol to the host device.

The controller unit sets a state of the nonvolatile memory device to an idle state after the host interface unit transmits the idle symbol.

The host interface unit outputs the boot code that is read by the memory control unit to the host device after the host interface unit transmits the idle symbol and the controller unit sets the state of the nonvolatile memory device to the idle state.

This nonvolatile memory device transmits an idle symbol to the host device when receiving a first symbol. When further receiving an idle symbol from the host device, the nonvolatile memory device is controlled to enter an idle state. This structure enables the nonvolatile memory device to transmit a boot code to the host device when both the host device and the nonvolatile memory device are in an idle state. As a result, the boot code can be transmitted from the nonvolatile memory device to the host device in a reliable and appropriate manner.

The idle state is a state in which the device has completed its boot-up process and is available but no processing is being performed.

A third aspect of the present invention provides the nonvolatile memory device of the first or second aspect of the present invention in which the host interface unit decodes data transmitted by the host device through 8b-10b conversion when receiving the data transmitted by the host device, and codes data to be transmitted to the host device through 8b-10b conversion when transmitting the data to the host device.

The host interface unit operates in the manner described below.

(1) When receiving, from the host device, a symbol including a synchronous code as data to be received, the host interface unit synchronizes the data to be received and a clock signal used to receive the data by synchronizing a phase of the data to be received and a phase of the clock signal.

(2) When receiving, from the host device, a first symbol including a synchronous code from the host device after synchronizing the clock signal and the data to be received, the host interface unit transmits a first symbol that is identical to the received first symbol to the host device, and after transmitting the first symbol, the host interface unit transmits, to the host device, the boot code that is read by the memory control unit from the nonvolatile memories.

This nonvolatile memory device can achieve synchronization in a simple manner using 8b-10b coding.

A fourth aspect of the present invention provides the nonvolatile memory device of one of the first to third aspects of the present invention in which the host interface unit stops transmitting the boot code when transmitting data having a predetermined size representing the boot code.

A fifth aspect of the present invention provides the nonvolatile memory device of one of the first to fourth aspects of the present invention in which the host interface unit transmits data representing the boot code by dividing the data in units of blocks having a predetermined length.

A sixth aspect of the present invention provides the nonvolatile memory device of one of the first to fifth aspects of the present invention in which the host interface unit transmits the received first symbol including the synchronous code without changing when the nonvolatile memories included in the nonvolatile memory device store no boot code.

The controller unit controls the nonvolatile memory device to be maintained in the idle state when the nonvolatile memories included in the nonvolatile memory device store no boot code and the host interface unit transmits the received first symbol including the synchronous code without changing.

The transmitting includes transmitting data for a target device (for the host device for example). For example, the transmitting includes transmitting data to the target device via a non-target device arranged on a communication path connected to the target device.

The transmitting without changing includes transmitting data (a signal) identical to the received data (a signal) to a unit external to the nonvolatile memory device.

A seventh aspect of the present invention provides a host device included in a memory system in which the host device transmits and receives data to and from one or more nonvolatile memory devices. The host device includes a controller unit that controls the entire host device or a part of the host device and a nonvolatile memory device interface unit.

The nonvolatile memory device interface unit (1) transmits an interface activating signal that is a signal carrying an instruction to activate an interface to the nonvolatile memory devices, (2) transmits, after transmitting the interface activating signal, a first symbol carrying an instruction generated by the host device to read a boot code to the nonvolatile memory device, and (3) receiving, from the nonvolatile memory device, data that is identical to the first symbol that the nonvolatile memory device interface unit has transmitted to the nonvolatile memory device, and then receives the boot code that is transmitted from the nonvolatile memory device.

In any of the interface activating process and the boot code reading process, this host device is simply required to receive, from the nonvolatile memory device, a signal identical to the signal transmitted from the host device. Receiving such a signal from the nonvolatile memory device starts the interface activating process and the boot code reading process. In a memory system in which a plurality of nonvolatile memory devices are connected to a host device, the host device is simply required to perform the same processing as described above for each of the nonvolatile memory devices to start the interface activating process and the boot code reading process in a simple and appropriate manner.

The use of this host device in a memory system including a host device and one or more nonvolatile memory devices enables the interface activating process and the boot code reading process to be performed in a simple and appropriate manner.

An eighth aspect of the present invention provides the host device of the seventh aspect of the present invention in which when the nonvolatile memory device interface unit transmits the first symbol to the nonvolatile memory device, and when receiving, from the nonvolatile memory device, data that is identical to the transmitted first symbol or data responding to the transmitted first symbol, (1) the nonvolatile memory device interface unit transmits an idle symbol to the nonvolatile memory device, (2) the controller unit sets a state of the host device to an idle state after the nonvolatile memory device interface unit transmits the idle symbol and the controller unit receives the idle symbol from the nonvolatile memory device, and (3) the nonvolatile memory device interface unit receives the boot code after the controller unit sets the state of the host device to the idle state, and transmits status information indicating a reception state of the boot code to the nonvolatile memory device.

This host device transmits a first symbol to the nonvolatile memory device. When receiving an idle symbol from the nonvolatile memory device, the host device is controlled to enter an idle state. This structure enables the host device to receive a boot code from the nonvolatile memory device when both the host device and the nonvolatile memory device are in an idle state. As a result, the host device can receive the boot code transmitted from the nonvolatile memory device in a reliable and appropriate manner.

A ninth aspect of the present invention provides a memory system in which data is transmitted and received between a host device and one or more nonvolatile memory devices.

The host device includes a controller unit that controls the entire host device or a part of the host device, and a nonvolatile memory device interface unit.

The nonvolatile memory device includes one or more nonvolatile memories and a controller unit that controls reading and/or writing of data to and from the nonvolatile memories.

The controller unit includes a host interface unit, and a memory control unit that reads a boot code of the host device from the nonvolatile memories.

This memory system operates in the manner described below.

(H1) The nonvolatile memory device interface unit transmits an interface activating signal that is a signal carrying an instruction to activate an interface to the nonvolatile memory device.

(S1) When the host interface unit receives the interface activating signal from the host device, the host interface unit transmits an interface activating signal that is identical to the received interface activating signal to the host device.

(H2) The nonvolatile memory device interface unit transmits, to the nonvolatile memory device, a first symbol carrying an instruction generated by the host device to read the boot code after transmitting the interface activating signal.

(S2) When receiving, from the host device, the first symbol carrying the instruction to read the boot code after transmitting the interface activating signal to the host device, the host interface unit transmits a first symbol that is identical to the received first symbol to the host device.

(S3) The host interface unit outputs, to the host device, the boot code that is read by the memory control unit after transmitting the first symbol to the host device.

(H3) The nonvolatile memory device interface unit receives the boot code transmitted from the nonvolatile memory device after receiving, from the nonvolatile memory device, data that is identical to the first symbol that the nonvolatile memory device interface unit has transmitted to the nonvolatile memory device.

In any of the interface activating process and the boot code reading process, this memory system is simply required to transmit, to the host device, a signal identical to the signal transmitted from the host device. Transmitting such a signal to the host device starts the interface activating process and the boot code reading process in a simple and appropriate manner. In a memory system in which a plurality of nonvolatile memory devices are connected to a host device, each nonvolatile memory device is simply required to perform the same processing as described above to start the interface activating process and the boot code reading process in a simple and appropriate manner.

This memory system including a host device and one or more nonvolatile memory devices performs the interface activating process and the boot code reading process in a simple and appropriate manner.

A tenth aspect of the present invention provides the memory system of the ninth aspect of the present invention in which the processes described below are performed. (HH1) The nonvolatile memory device interface unit transmits the first symbol to the nonvolatile memory device. (SS1) When receiving the first symbol from the host device, the host interface unit transmits a synchronous symbol that is identical to or differs from the received first symbol to the host device. (HH2) When receiving, from the nonvolatile memory device, data that is identical to the transmitted first symbol or data responding to the transmitted first symbol, the nonvolatile memory device interface unit transmits an idle symbol to the nonvolatile memory device. (HH3) The controller unit included in the host device sets a state of the host device to an idle state after the nonvolatile memory device interface unit transmits the idle symbol. (SS2) When receiving the idle symbol from the host device after transmitting the synchronous symbol to the host device, the host interface unit transmits an idle symbol to the host device. (SS3) The controller unit included in the nonvolatile memory device sets a state of the nonvolatile memory devices to an idle state after the host device interface unit transmits the idle symbol.

In this memory system, the nonvolatile memory device transmits, to the host device, an idle symbol for setting the host device to an idle state when receiving a first symbol. The nonvolatile memory device is also controlled to enter an idle state. This memory system enables both the host device and the nonvolatile memory device to enter an idle state and prepares for transmitting a boot code with a simple method.

An eleventh aspect of the present invention provides the memory system of the tenth aspect of the present invention in which the host interface unit outputs, to the host device, the boot code that is read by the memory control unit after the host interface unit transmits the idle symbol and the controller unit sets the state of the nonvolatile memory device to the idle state.

The nonvolatile memory device interface unit receives the boot code after the nonvolatile memory device interface unit transmits the idle symbol and the controller unit sets the state of the host device to the idle state, and transmits status information indicating a reception state of the boot code to the nonvolatile memory device.

This memory system enables a boot code to be transmitted to the host device when both the host device and the nonvolatile memory device are in an idle state. Further, the host device transmits status information indicating the reception state of the boot code to the nonvolatile memory device. This enables the nonvolatile memory device to determine whether the boot code has been transmitted successfully to the host device (for example, the boot code may be transmitted again based on the status).

As a result, this memory system enables the boot code to be transmitted from the nonvolatile memory device to the host device in a reliable and appropriate manner.

A twelfth aspect of the present invention provides the memory system of one of the ninth to eleventh aspects of the present invention in which the nonvolatile memory device stops transmitting the boot code when transmitting data having a predetermined size representing the boot code, and the host device determines that the boot code transmission performed by the nonvolatile memory device is stopped when receiving data having the predetermined size representing the boot code.

A thirteenth aspect of the present invention provides the memory system of one of the ninth to eleventh aspects of the present invention in which the host device receives data representing the boot code when the nonvolatile memory device transmits the data representing the boot code in units of blocks having a predetermined length.

A fourteenth aspect of the present invention provides the memory system of one of the ninth to eleventh aspects of the present invention in which the nonvolatile memory device transmits the received first symbol including the synchronous code without changing when storing no boot code.

When the host device receives no data representing the boot code after transmitting the first symbol including the synchronous code a predetermined number of times or for a predetermined period of time, the host device determines that the nonvolatile memory device stores no boot code.

A fifteenth aspect of the present invention provides the memory system of one of the ninth to fourteenth aspects of the present invention in which the first symbol includes a boot device identifier.

The host device sets the boot device identifier in the first symbol including the synchronous code. The boot device identifier identifies the nonvolatile memory device from which the boot code is to be output. The host device transmits the first symbol in which the boot device identifier has been set.

The nonvolatile memory device includes a storage unit storing first boot device flag information and second boot device flag information. When receiving the first symbol including the synchronous code, the nonvolatile memory device determines whether the boot code is to be transmitted based on the boot device identifier set in the received first symbol including the synchronous code.

A sixteenth aspect of the present invention provides the memory system of one of the ninth to fifteenth aspects of the present invention in which the host device and the one or more nonvolatile memory devices are connected using a ring topology.

A seventeenth aspect of the present invention provides the memory system of one of the ninth to fifteenth aspects of the present invention in which the host device and the one or more nonvolatile memory devices are connected using a hub topology.

An eighteenth aspect of the present invention provides a data communication method for performing data communication between a host device and one or more nonvolatile memory devices. The host device includes a controller unit that controls the entire host device or a part of the host device and a nonvolatile memory device interface unit. The nonvolatile memory device includes one or more nonvolatile memories, a host interface unit, and a controller unit that controls reading and/or writing of data to and from the nonvolatile memories. The controller unit includes a memory control unit that reads a boot code of the host device from the nonvolatile memories.

The data communication method includes the processes described below:

(H1) The process of transmitting, using the nonvolatile memory device interface unit, an interface activating signal that is a signal carrying an instruction to activate an interface to the nonvolatile memory device.

(S1) The process of transmitting, using the host interface unit, an interface activating signal that is identical to the interface activating signal to the host device when the host interface unit receives the interface activating signal from the host device.

(H2) The process of transmitting, using the nonvolatile memory device interface unit, to the nonvolatile memory device, a first symbol carrying an instruction generated by the host device to read the boot code after the nonvolatile memory device interface unit transmits the interface activating signal.

(S2) The process of transmitting, using the host interface unit, a first symbol that is identical to the first symbol to the host device when receiving, from the host device, the first symbol carrying an instruction to read the boot code after transmitting the interface activating signal to the host device.

(S3) The process of outputting, using the host interface unit, the boot code that is read by the memory control unit to the host device after transmitting the first symbol to the host device.

(H3) The process of receiving, using the nonvolatile memory device interface unit, the boot code that is transmitted by the nonvolatile memory device after receiving, from the nonvolatile memory device, data that is identical to the first symbol that is transmitted to the nonvolatile memory device.

The data communication method has the same advantageous effects as the memory system of the ninth aspect of the present invention.

A nineteenth aspect of the present invention provides a program enabling a computer to implement the data communication method of the eighteenth aspect of the present invention.

The program has the same advantageous effects as the memory system of the ninth aspect of the present invention.

Advantageous Effects

The present invention provides a memory system including a host device and one or more nonvolatile memory devices in which the host device can read a boot code from the nonvolatile memory devices based on a simple mechanism, a host device forming such a memory system, and a nonvolatile memory device forming such a memory system.

BRIEF DESCRIPTION OF DRAWINGS

FIGS. 2B-A and 2B-B are diagrams describing a boot code reading sequence used in the memory system according to the first embodiment.

FIGS. 7A to 7D-2 are diagrams describing the structure of a first symbol and a second symbol each including a synchronous code generated by the host device in each of the memory systems according to the first to third embodiments of the present invention.

Figure 1:
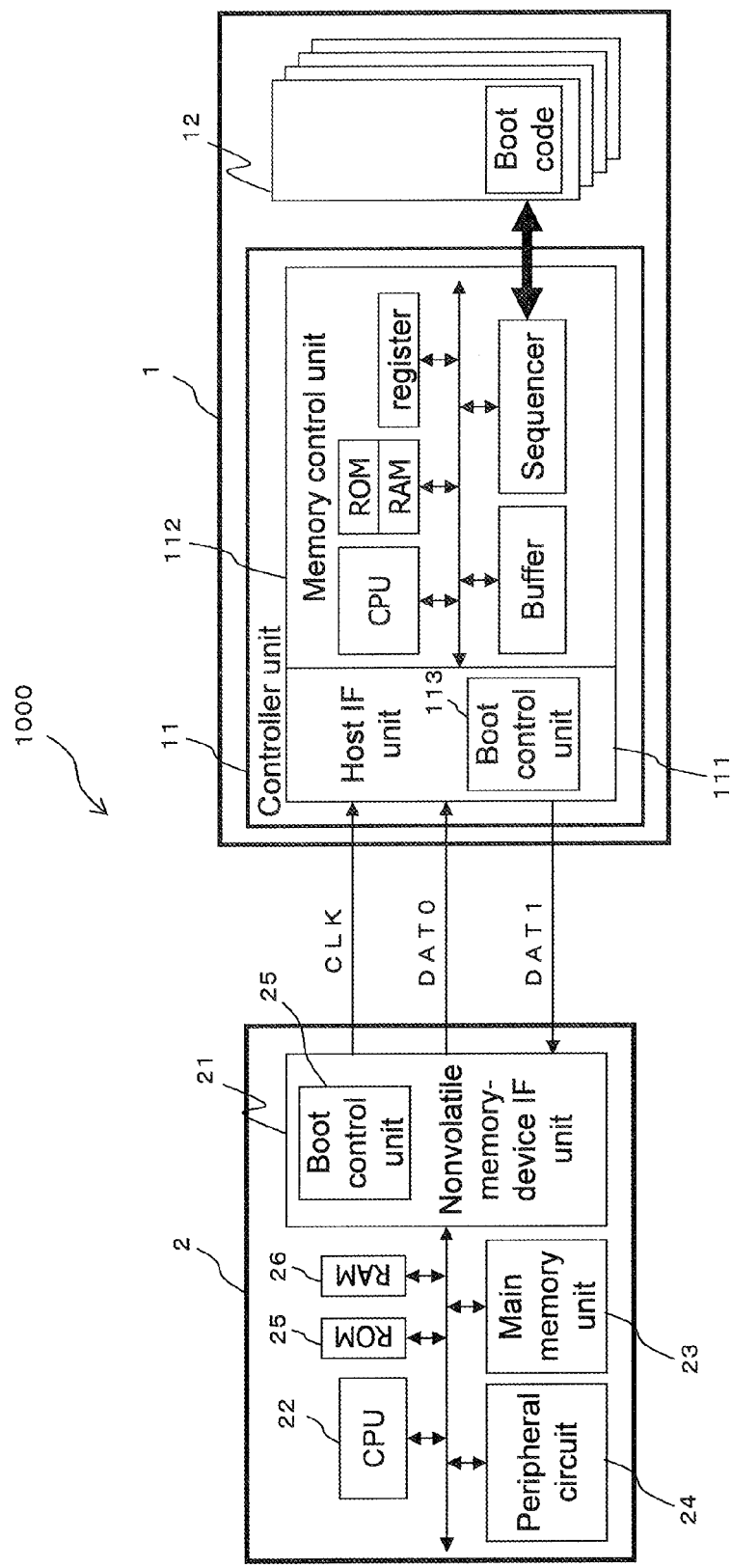
FIG. 1 is a schematic diagram showing the structure of a memory system according to a first embodiment of the present invention.

REFERENCE SIGNS LIST 1000 memory system
1 nonvolatile memory device
2 host device
3 hub
11 controller unit
12 nonvolatile memory
111 host IF unit
112 memory control unit
1a, 1b, 1c nonvolatile memory device
21 memory-device IF unit
22 CPU
23 main memory
24 peripheral circuit
25 boot control unit
81 first boot device flag
82 second boot device flag

DESCRIPTION OF EMBODIMENTS

Embodiments of the present invention will now be described with reference to the drawings. The same components are given the same reference symbols or numerals unless otherwise specified.

First Embodiment 1.1 Structure of Memory System

FIG. 1 is a block diagram showing the structure of a memory system 1000 according to a first embodiment of the present invention. As shown in FIG. 1, the memory system 1000 includes a host device 2 and a nonvolatile memory device 1. The host device 2 and the nonvolatile memory device 1 transmit and receive commands, responses, or data to and from each other with (1) a clock CLK, (2) a signal line DAT0, and (3) a signal line DAT1. The signal line DAT0 is used to transmit data from the host device 2 to the nonvolatile memory device 1. The signal line DAT1 is used to transmit data from the nonvolatile memory device 1 to the host device 2. The components that are not essential to the present invention are not shown in FIG. 1.

The memory system 1000 uses differential signaling serial transmission to transmit and receive signals (data) with the lines CLK, DAT0, and DAT1. Alternatively, the memory system 1000 may use single ended transmission to transmit and receive signals with the lines CLK, DAT0, and DAT1. The signal lines for transmitting data should not be limited to the two lines DAT0 and DAT1. The memory system 1000 may use more signal lines. The use of more signal lines increases the communication speed of the memory system 1000. The number of signal lines for transmitting data from the host device 2 to the nonvolatile memory device 1 and the number of signal lines for transmitting data from the nonvolatile memory device 1 to the host device 2 may be the same or may be different.

1.1.1 Structure of Host Device

As shown in FIG. 1, the host device 2 includes a CPU 22, a ROM 25, a RAM 26, a main memory unit 23, a peripheral circuit 24, and a nonvolatile memory-device IF unit 21. The CPU 22 controls the overall operation of the host device 2. These functional units of the host device 2 may be formed using the same semiconductor LSI (large scale integration) circuit, or some or all of the functional units of the host device 2 may be formed using different semiconductor LSI circuits. Alternatively, the functional units of the host device 2 may be formed by combining hardware and software.

The nonvolatile memory-device IF unit 21 communicates with the nonvolatile memory device 1 using the clock signal transmission path CLK, the data transmission path DAT0, and the data transmission path DAT1. The nonvolatile memory-device IF unit 21 further includes a boot control unit 25. The boot control unit 25 executes control to read a boot code from the nonvolatile memory device 1 when the system is booted.

The boot control unit 25 may be formed using hardware, or may be formed by combining hardware with simple software used to control the hardware to read a boot code.

The functional units of the host device 2 may be connected with a bus as shown in FIG. 1. Alternatively, some or all of the functional units of the host device 2 may be directly connected to each other.

1.1.2 Structure of Nonvolatile Memory Device

The nonvolatile memory device 1 includes a controller unit 11 and one or more nonvolatile memories 12.

The controller unit 11 includes a host IF unit 111 and a memory control unit 112.

As shown in FIG. 1, the memory control unit 112 includes a CPU, a ROM and a RAM, and a buffer and a sequencer for transferring data to and from the nonvolatile memories. These functional units of the memory control unit 112 may be formed using the same semiconductor LSI circuit, or some or all of the functional units of the memory control unit 112 may be formed using different semiconductor LSI circuits. Alternatively, the functional units of the memory control unit 112 may be formed by combining hardware and software.

The host IF unit 111 communicates with the host device 2 using the clock signal transmission path CLK, the data signal transmission path DAT0, and the data signal transmission path DAT1. The host IF unit 111 includes a boot control unit 113 that transfers a boot code stored in the nonvolatile memories 12 to the host device 2 in response to an instruction transmitted from the host device 2.

The nonvolatile memory device 1 may have a single set of a clock signal transmission path CLK, a data transmission path DAT0, and a data transmission path DAT1, or may have two sets of clock signal transmission paths CLK, data transmission paths DAT0, and data transmission paths DAT1 when the nonvolatile memory device 1 uses a chain topology (described later).

In FIG. 1, the clock signal transmission path CLK is formed by a terminal different from the terminals forming the data transmission path DAT0 and the data transmission path DAT1. The present invention should not be limited to this structure. For example, the memory system 1000 may use embedded clock transmission, which transmits a clock signal superimposed on a signal (data) that is transmitted using a signal line (for example the data transmission path DAT0 and/or the data transmission path DAT1). The use of the embedded clock transmission eliminates the need for the clock signal transmission path CLK and the terminal forming the clock signal transmission path CLK.

Although the nonvolatile memory device 1 of the present embodiment stores a boot code in its nonvolatile memories 12 as shown in FIG. 1, the present invention should not be limited to this structure. For example, the nonvolatile memory device 1 may store a boot code in another memory (for example a nonvolatile memory), such as a ROM or a flash memory included in the memory control unit 112 or in the host IF unit 111.

For ease of explanation, the host device 2 and the nonvolatile memory device 1 of the first embodiment are assumed to transmit data after converting the data through 8b-10b conversion. More specifically, each of the host device 2 and the nonvolatile memory device 1 encodes every 8-bit data to 10-bit data before transmitting the data. This data conversion is defined by, for example, ANSI INCITS 230-1994. The specification defines 10-bit codes including 256 different D codes representing 8-bit data 0x00 to 0xFF and K codes functioning as control codes. The K codes are used as, for example, special symbols indicating the start or the end of each data block, or as synchronous codes for synchronization (described later).

1.2 Operation of Memory System

The operation of the memory system 1000 with the above-described structure will now be described.

1.2.1 Normal Start-up Sequence

A normal start-up sequence used in the memory system 1000 will now be described.

Figure 2A:
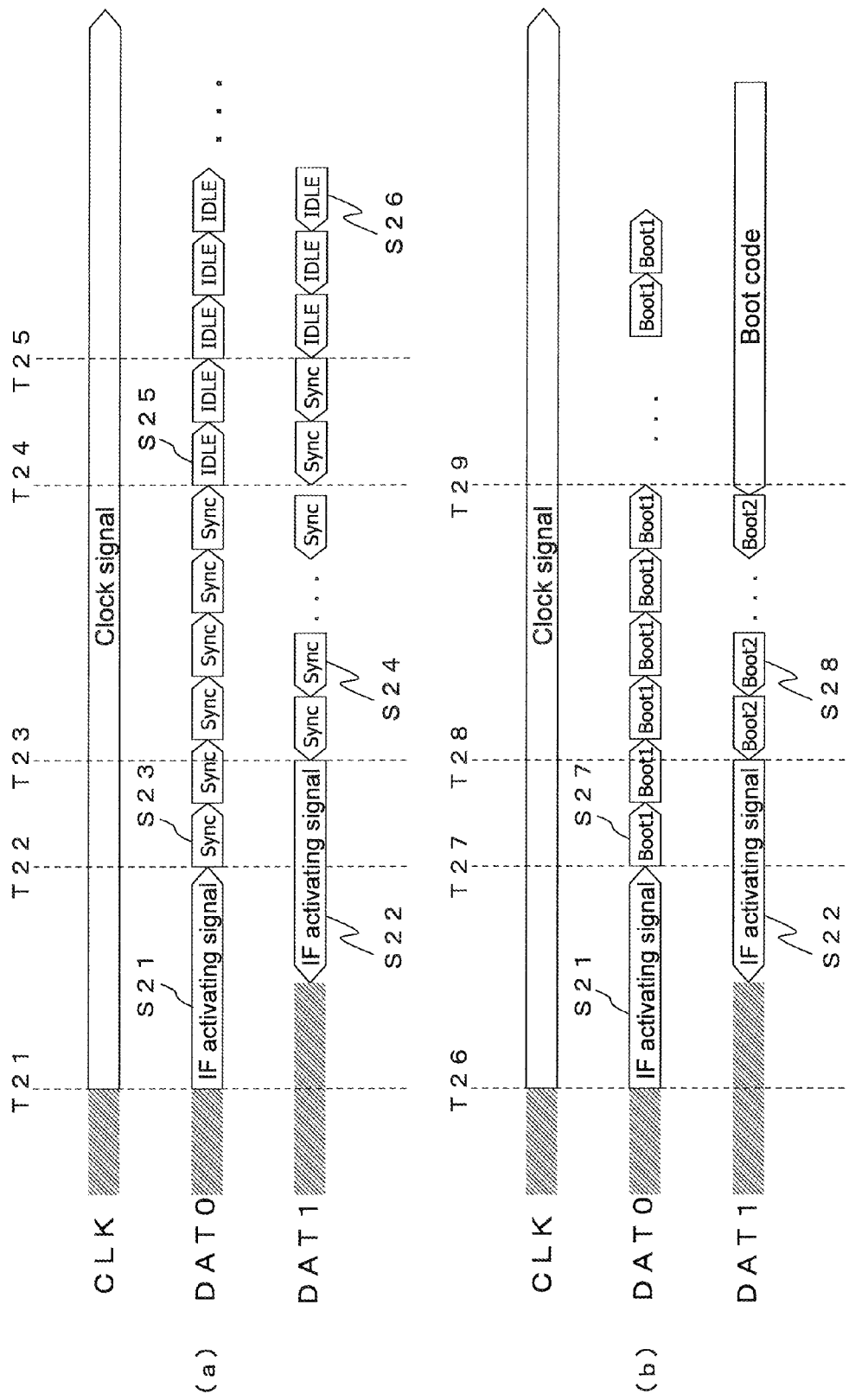
FIGS. 2A-A and 2A-B are diagrams describing a normal start-up sequence and a normal boot code reading sequence used in the memory system according to the first embodiment.

FIG. 2A(a) is a diagram describing a normal start-up sequence that is a sequence of processes performed by the host device 2 and the nonvolatile memory device 1 in the memory system 1000 of the first embodiment.

Processing from Timing T21

In FIG. 2A(a), the host device 2 provides a clock signal using the CLK line (the clock signal transmission path CLK) and also transmits an IF activating signal S21 to the nonvolatile memory device 1 using the signal line (data transmission path) DAT0 at timing T21. The IF activating signal S21 may be provided from the host device 2 to the nonvolatile memory device 1 by fixing the level of the signal line DAT0 to low (with a logical value of 0) (to a voltage value indicating a low level) or to high (with a logical value of 1) (to a voltage value indicating a high level), or may be provided by transmitting a certain pattern (a pattern signal) from the host device 2 to the nonvolatile memory device 1. When the IF activating signal is provided by transmitting a pattern (a pattern signal), a predetermined pattern may be transmitted repeatedly. In that case, the cycle in which the value of the signal line changes may be the same as the frequency of a clock signal (clock frequency) provided using the clock signal transmission path CLK, or may be shorter or longer than the clock frequency (the value of the signal line may change in a cycle shorter than the cycle of the clock frequency or the value of the signal line may change in a cycle longer than the cycle of the clock frequency).

The nonvolatile memory device 1 transmits an IF activating signal S22 to the host device 2 using the signal line (data transmission path) DAT1 when detecting reception of the IF activating signal S21 transmitted from the host device 2. The IF activating signal S22 may be the same as or may be different from the IF activating signal S21 transmitted by the host device 2.

Processing from T22

The host device 2 receives the IF activating signal S22 from the nonvolatile memory device 1, and transmits a synchronization symbol S23 to the nonvolatile memory device 1 using the signal line DAT0 at timing T22. The synchronization symbol S23 is used to achieve synchronization, or specifically is used to synchronize the phase of a clock signal transmitted from the nonvolatile memory device 1 using the clock line CLK with the phase of a signal (data) transmitted using the data line DAT0. The synchronization is performed to prepare for data reception to be performed in a correct manner. The synchronization symbol S23 may be, for example, a comma code, which is a K code (for example, K28.5. 001111 1010 or 110000 0101). Alternatively, the synchronization symbol S23 may consist of one or more codes including a comma code. The synchronization symbol S23 is transmitted repeatedly a predetermined number of times. The predetermined number of times the synchronization symbol S23 to be transmitted is determined in an appropriate manner to enable the nonvolatile memory device 1 to achieve synchronization in a reliable manner.

The nonvolatile memory device 1 receives the synchronization symbol S23. When completing the preparations for correct data reception by synchronizing the phase of a clock signal transmitted using the clock line CLK and the phase of a signal (data) transmitted using the data line DAT0, the nonvolatile memory device 1 transmits a synchronization symbol S24 to the host device 2 using the data line DAT1. The synchronization symbol S24 is used by the host device 2 to preparer for the correct data reception by synchronizing the phase of a signal (data) transmitted using the data line DAT1 with the phase of an internal clock signal of the host device 2 that receives the signal (data) transmitted using the data line DAT1. The synchronization symbol S24 may be the same as the synchronization symbol S23 transmitted by the host device 2. The synchronization symbol S24 may be different from the synchronization symbol S23 when the synchronization symbol S24 consists of a plurality of codes. The synchronization symbol S23 and the synchronization symbol S24 both contain a code for synchronization, which can be a comma code for example.

Processing from Timing T24

The host device 2 receives the synchronization symbol S24 transmitted by the nonvolatile memory device 1. The host device 2 then transmits an idle symbol S25 indicating an idle state to the nonvolatile memory device 1 using the data line DAT0 at timing T24. The idle symbol S25 may contain a freely selected code, but may contain a code for synchronization, such as a comma code, to maintain the synchronized state of the host device 2 and the nonvolatile memory device 1.

Processing from Timing T25

The nonvolatile memory device 1 receives the idle symbol S25. The nonvolatile memory device 1 then transmits an idle symbol S26 to the host device 2 using the data line DAT1 at timing T25. The idle symbol S26 may be the same as or different from the idle symbol S25.

In the memory system 1000, each of the host device 2 and the nonvolatile memory device 1 first performs synchronization, and then transmits an idle symbol after establishing synchronization. The normal start-up sequence then completes. This enables the host device 2 and the nonvolatile memory device 1 to thereafter communicate with each other using commands, responses, and data.

1.2.2 Boot Code Reading Sequence

A boot code reading sequence used in the memory system 1000 will now be described.

FIG. 2A(b) is a diagram describing a boot code reading sequence that is a sequence of processes performed by the host device 2 and the nonvolatile memory device 1 in the memory system 1000 according to the first embodiment. The components in FIG. 2A(b) that are the same as the components shown in FIG. 2A(a) are given the same reference numerals as those components.

Processing from Timing T26

In FIG. 2A(b), the host device 2 provides a clock signal using the CLK line and also transmits an IF activating signal S21 to the nonvolatile memory device 1 using the data line DAT0 at timing T26.

When detecting reception of the IF activating signal S21, the nonvolatile memory device 1 transmits an IF activating signal S22 to the host device 2 using the data line DAT1.

Processing from Timing T27

The host device 2 receives the IF activating signal S22 from the nonvolatile memory device 1. The host device 2 then transmits a first symbol S27 containing a synchronous code to the nonvolatile memory device 1 using the signal line DAT0 at timing T27. The first symbol S27 carries an instruction causing the nonvolatile memory device 1 to output a boot code stored in its nonvolatile memories 12 using the data line DAT1. The first symbol S27 is transmitted repeatedly until the nonvolatile memory device 1 stops outputting the boot code. The transmission of the first symbol may be stopped when the nonvolatile memory device 1 starts outputting the boot code, or when the first symbol is transmitted a predetermined number of times (for example 256 times or 1000 times) or when the first symbol is transmitted for a predetermined period of time (for example 10 ms or 200 ms). When the host device 2 fails to receive data indicating the boot code from the nonvolatile memory device 1 after transmitting the first symbol S27 the predetermined number of times or for the predetermined period of time, the host device 2 determines that the nonvolatile memory device 1 stores no boot code, or determines that the nonvolatile memory device 1 is disabled to output the boot code due to, for example, an error.

Processing from Timing T28

The nonvolatile memory device 1 receives the first symbol S27 from the host device 2. The nonvolatile memory device 1 then transmits a second symbol S28 to the host device 2 at timing T28. When completing the preparations for outputting a boot code, the nonvolatile memory device 1 outputs, following the boot code output symbol, the boot code to the host device 2 at timing T29.

The host device 2 receives the boot code from the nonvolatile memory device 1, and loads the received boot code using the main memory unit 23. The host device 2 then processes the code expanded using the main memory unit 23 to perform the subsequent processing in the system boot-up.

The second symbol S28 containing a synchronous code transmitted by the nonvolatile memory device 1 may be the same as or may be different from the symbol S27 transmitted from the host device 2. The symbol S27 and the symbol S28 both contain a code for synchronization.

Figure 2B:
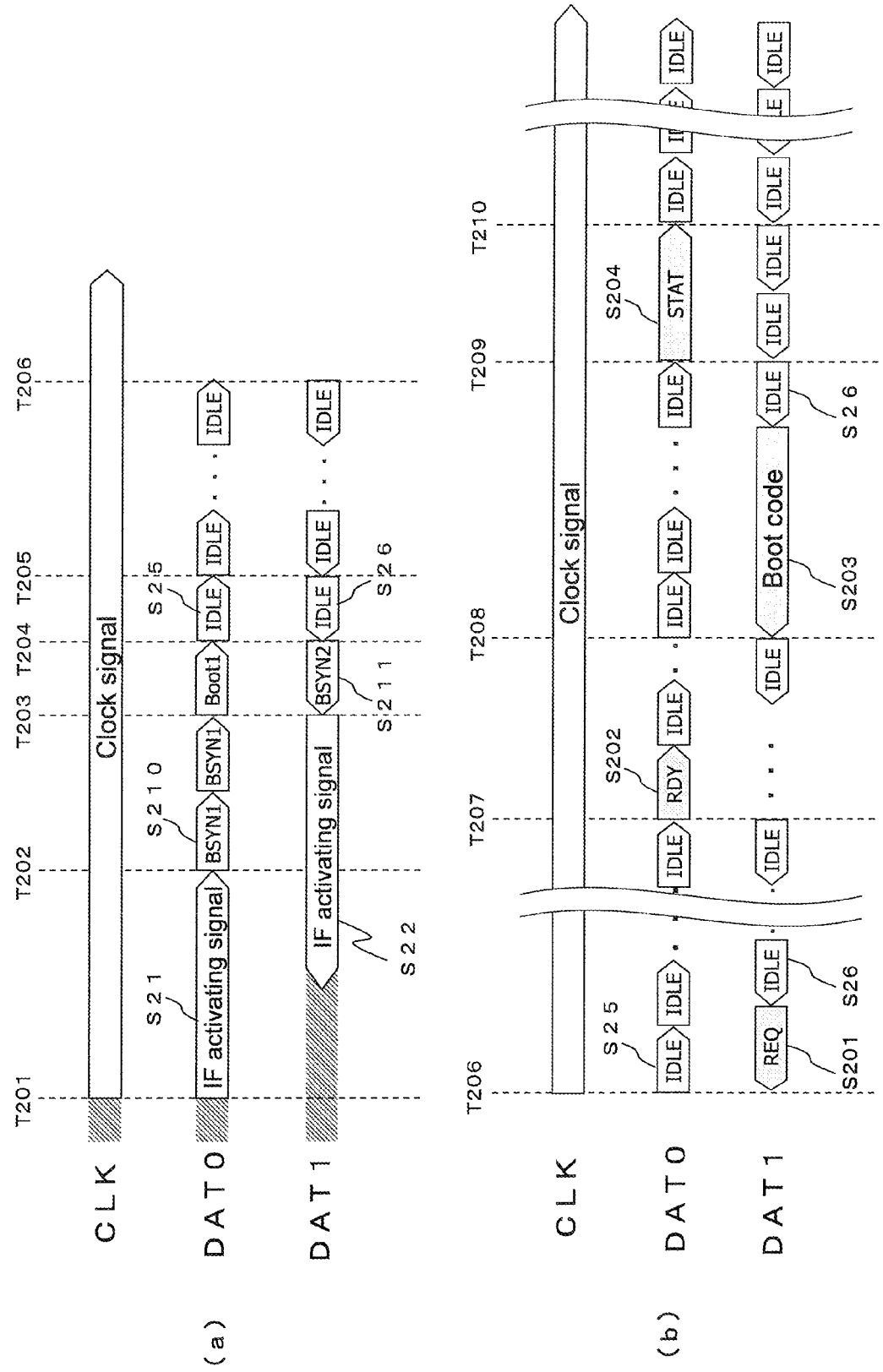

In another example, the memory system 1000 may perform a boot sector reading sequence shown in FIG. 2B. The processing performed in this case will be described with reference to FIG. 2B.

FIG. 2B is a diagram describing a boot code reading sequence that is a sequence of processes performed by the host device 2 and the nonvolatile memory device 1 in the memory system 1000 according to the first embodiment. The components in FIG. 2B that are the same as the components shown in FIG. 2A are given the same reference numerals as those components.

Processing from Timing T201

In FIG. 2B, the host device 2 provides a clock signal using the CLK line and also transmits an IF activating signal S21 to the nonvolatile memory device 1 using the data line DAT0 at timing T201.

When detecting reception of the IF activating signal S21, the nonvolatile memory device 1 transmits an IF activating signal S22 to the host device 2 using the data line DAT1.

Processing from Timing T202

The host device 2 receives the IF activating signal S22 from the nonvolatile memory device 1. The host device 2 then transmits, to the nonvolatile memory device 1, a first Boot code readout synchronous symbol (BSYN1) S210 containing a synchronous code at timing T202 using the data line DAT0.

The first Boot code readout synchronous symbol (BSYN1) S210 carries an instruction causing the nonvolatile memory device 1 to output a boot code stored in the nonvolatile memories 12 using the data line DAT1. The first symbol S210 is transmitted repeatedly until the host device 2 detects reception of a second Boot code readout synchronous symbol (BSYN2) S211 transmitted from the nonvolatile memory device 1.

The first Boot code readout synchronous symbol (BSYN1) S210 is a symbol containing a synchronous code, and may be the same as or may be different from the first symbol S27.

The second Boot code readout synchronous symbol (BSYN2) S211 may be the same as or may be different from the first Boot code readout synchronous symbol (BSYN1) S210. The second Boot code readout synchronous symbol (BSYN2) S211 is a symbol containing a synchronous code, and may be the same as or may be different from the second symbol S28.

Processing from Timing T203

The nonvolatile memory device 1 receives the first Boot code readout synchronous symbol S210 transmitted from the host device 2, and transmits a second Boot code readout synchronous symbol S211 at timing T203.

Processing from Timing T204

The host device 2 receives the second Boot code readout synchronous symbol S211 transmitted from the nonvolatile memory device 1. The host device 2 then transmits an idle symbol S25 to the nonvolatile memory device 1 at timing T204.

When receiving the idle symbol S25 from the host device 2, the nonvolatile memory device 1 transmits an idle symbol S26 to the host device 2.

Processing from Timing T205

The host device 2 receives the idle symbol S26 from the nonvolatile memory device 1 at timing T205, and enters a state in which the host device 2 waits for a boot code to be transmitted from the nonvolatile memory device 1, and continuously transmits the idle symbol S25 to the nonvolatile memory device 1.

The nonvolatile memory device 1 performs preparations for transmitting a boot code. The nonvolatile memory device 1 continuously transmits an idle symbol S26 to the host device 2 until completing the preparations for the boot code transmission.

Processing from Timing T206

When completing the preparations for the boot code transmission, the nonvolatile memory device 1 transmits, at timing T206, a symbol REQ (a symbol S201 shown in FIG. 2B(b)) for requesting to start flow control to the host device 2 using the signal line DAT1. Subsequently, the nonvolatile memory device 1 transmits an idle symbol S26 to the host device 2 using the signal line DAT1.

Processing from Timing T207

When completing the preparations for receiving data from the nonvolatile memory device 1, the host device 2 transmits a symbol RDY (a symbol S202 shown in FIG. 2B(b)) to the nonvolatile memory device 1 using the signal line DAT0 at timing T207. Subsequently, the host device 2 transmits an idle symbol S25 to the nonvolatile memory device 1 using the signal line DAT0.

Processing from Timing T208

The nonvolatile memory device 1 receives the symbol RDY from the host device 2. The nonvolatile memory device 1 then transmits a boot code to the host device 2 using the data line DAT1 at timing T208. Subsequently, the nonvolatile memory device 1 transmits an idle symbol S26 to the host device 2 using the signal line DAT1.

During a period from timing T206 to timing T207, the host device 2 continuously transmits the idle symbol S25 to the nonvolatile memory device 1.

Processing from Timing T209

As shown in FIG. 2B(b), the host device 2 transmits a status symbol S204 (a symbol STAT) to the nonvolatile memory device 1 using the signal line DAT0 at timing T209. The status symbol S204 contains information indicating whether the host device 2 has successfully received the boot code transmitted from the nonvolatile memory device 1. When the host device 2 has an error and has failed to successfully receive the boot code transmitted from the nonvolatile memory device 1, the status symbol S205 may contain information indicating whether the error can be eliminated (the recovery from the error is possible) if the nonvolatile memory device 1 transmits the boot code again. For example, the data transmitted from the nonvolatile memory device 1 and received by the host device 2 may have a cyclic redundancy check (CRC) error caused by bit errors occurring on the transmission path. In such a case, the data transmission is likely to be performed correctly from the nonvolatile memory device 1 to the host device 2 if the data transmission is performed again. Such an error is an example of the above error from which the recovery is possible. When the error recovery is possible, the processing from timing T206 to timing T210 in FIG. 2B(b) is performed again in the memory system 1000. This enables the host device 2 to receive the boot code from the nonvolatile memory device 1 in a more reliable manner.

The host device 2 transmits the status symbol S204 to the nonvolatile memory device 1, and then transits an idle symbol S25 to the nonvolatile memory device 1.

In the memory system 1000, the processing from timing T206 to timing T210 may be repeated a predetermined number of times. When, for example, a boot code having 16 KB is to be transmitted from the nonvolatile memory device 1 to the host device 2, the processing for transmitting the boot code by dividing the code in 2 KB units (the processing from timing T206 to timing T210) is to be repeated eight times.

As described above, the memory system 1000 performs flow control (flow control by handshaking) between the host device 2 and the nonvolatile memory device 1 using a REQ symbol (a symbol S201) and a RDY symbol (a symbol S202). The memory system 1000 then enables the host device 2 to return, to the nonvolatile memory device 1, a status indicating whether the boot code transmitted from the nonvolatile memory device 1 to the host device 2 has been received correctly by the host device 2 from the host device 2 to the nonvolatile memory device 1 (performs handshaking). This enables the boot code to be transmitted from the nonvolatile memory device 1 to the host device 2 in a more reliable manner.

Although the host device 2 transmits the first symbol S27 to the nonvolatile memory device 1 after transmitting the IF activating signal in FIG. 2A(b), the present invention should not be limited to this method. For example, the host device 2 may transmit the first symbol to the nonvolatile memory device 1 after performing a normal boot-up sequence shown in FIG. 9.

Processing from Timing T91

Figure 9:
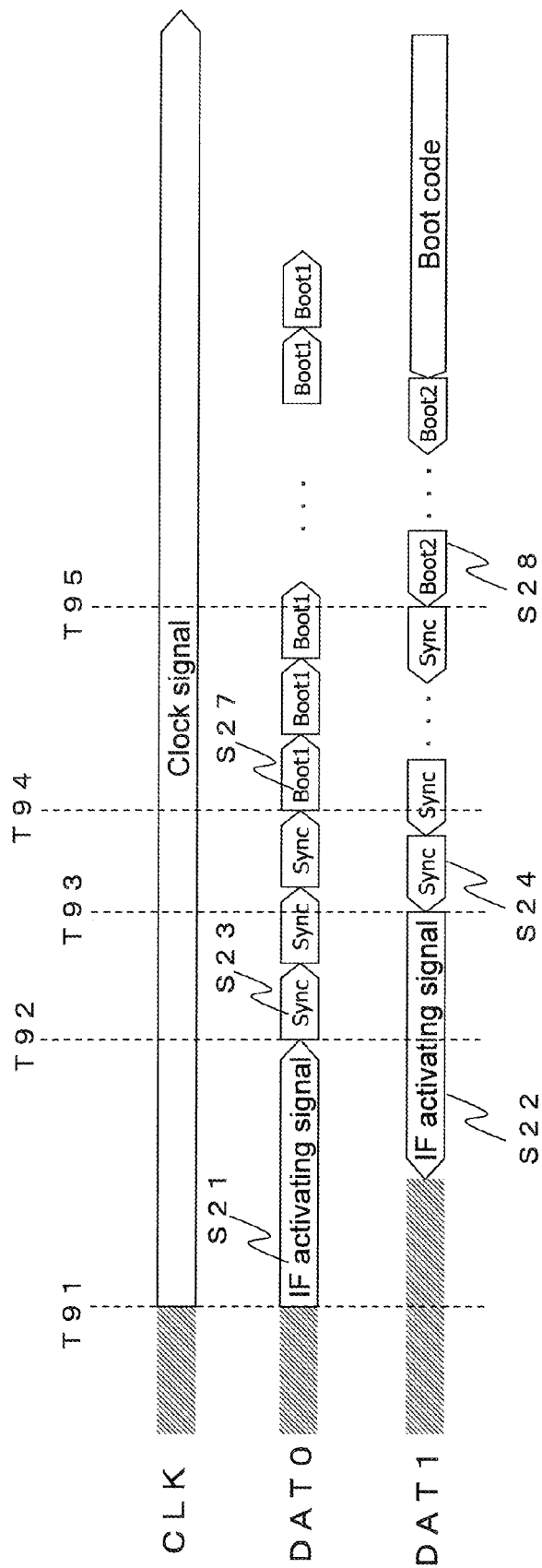
FIG. 9 is a diagram describing another boot code reading sequence used in the memory system according to the first embodiment.

As shown in FIG. 9, the host device 2 starts providing a clock signal to the nonvolatile memory device 1 and also transmits an IF activating signal S21 to the nonvolatile memory device 1 at timing T91.

The nonvolatile memory device 1 receives the IF activating signal S21 from the host device 2, and then transmits an IF activating signal S22 to the host device 2.

Processing from Timing T92

When receiving the IF activating signal S22 from the nonvolatile memory device 1, the host device 2 repeatedly transmits a synchronization symbol S23 to the nonvolatile memory device 1 at timing T92.

The nonvolatile memory device 1 receives the synchronization symbol S23. When completing the preparations for correct data reception using the data line DAT0, the nonvolatile memory device 1 transmits a synchronization symbol S24 to the host device 2 at timing T93.

Processing from Timing T94

The host device 2 receives the synchronization symbol S24 from the nonvolatile memory device 1. When completing the preparations for correct data transmission using the data line DAT1, the host device 2 transmits a first symbol S27 to the nonvolatile memory device 1 at timing T94.

Processing from Timing T95

The nonvolatile memory device 1 receives the first symbol S27 from the host device 2, and then transmits a second symbol S28 to the host device 2 at timing T95. When completing the preparations for transmitting a boot code, the nonvolatile memory device 1 transmits, following the second symbol, a boot code to the host device 2.

As described above, the host device 2 may transmit the first symbol S27 to the nonvolatile memory device 1 after performing the normal boot-up sequence in the memory system 1000.

The processing performed by the host device 2 to stop the output of the boot code from the nonvolatile memory device 1 will now be described with reference to FIG. 3.

Figure 3:
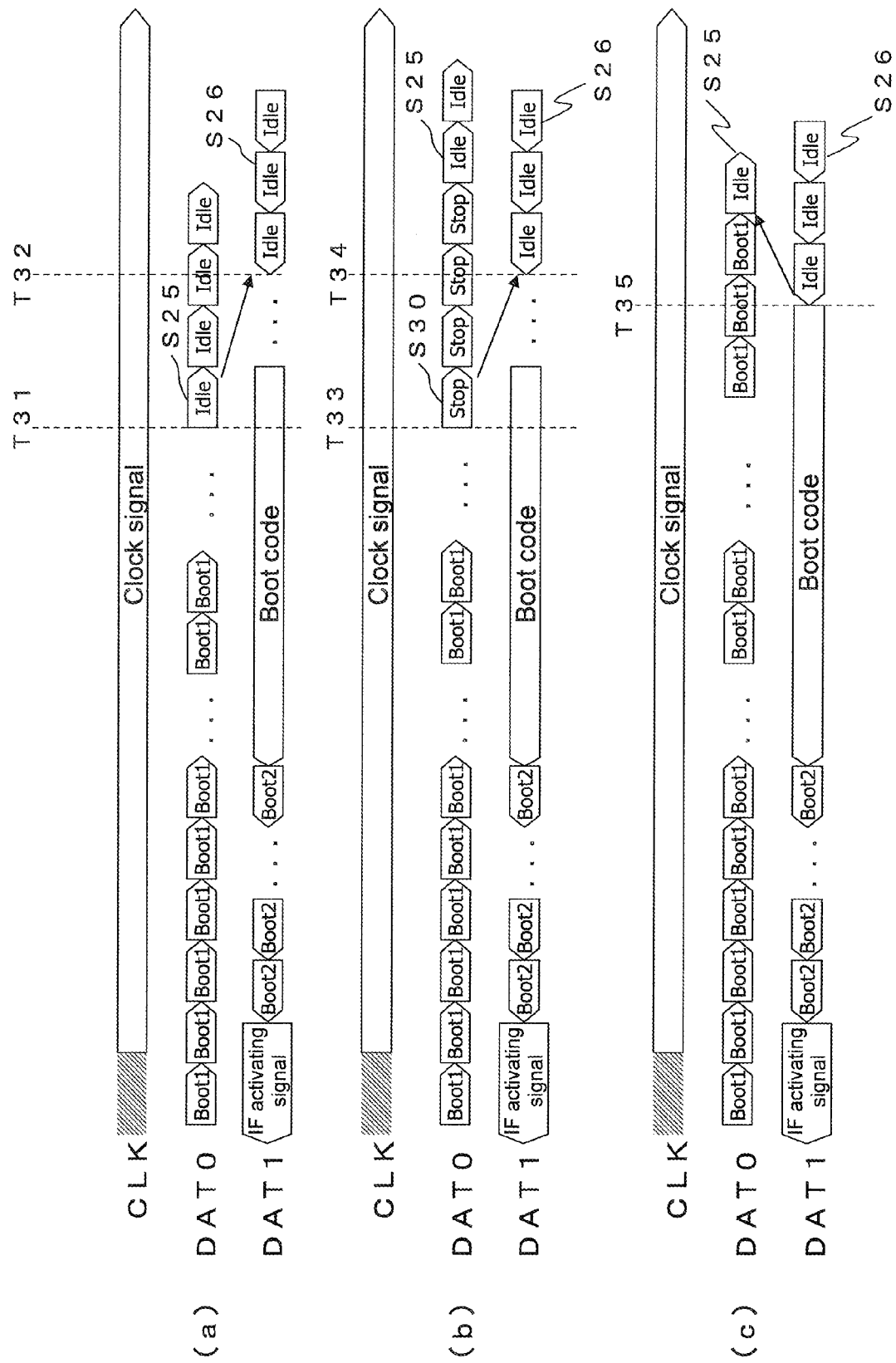
FIGS. 3A to 3C are diagrams describing the processing for stopping the output of a boot code in the memory system according to the first embodiment.

FIG. 3 is a diagrams describing the processing performed by the host device 2 to stop the output of the boot code from the nonvolatile memory device 1.

As shown in FIG. 3(a), the host device 2 transmits an idle symbol S25 to the nonvolatile memory device 1 using the data line DAT0 at timing T31. The nonvolatile memory device 1 receives and recognizes the idle symbol transmitted from the host device 2. The nonvolatile memory device 1 then stops the output of the boot code, and transmits an idle symbol S26 to the host device 2 using the data line DAT1 at timing T32.

As shown in FIG. 3(b), the host device 2 transmits a stop symbol S30 to the nonvolatile memory device 1 using the data line DAT0 at timing T33. The nonvolatile memory device 1 receives and recognizes the stop symbol transmitted from the host device 2. The nonvolatile memory device 1 then stops the output of the boot code, and transmits an idle symbol S26 to the host device 2 using the data line DAT1 at timing T34.

As shown in FIG. 3(c), the nonvolatile memory device 1 completely transmits a predetermined size of boot code data to the host device 2, and then transmits an idle symbol S26 to the host device 2 using the data line DAT1 at timing T35.

The host device 2 receives and recognizes the idle symbol S26 transmitted from the nonvolatile memory device 1, and then transmits an idle symbol S25 to the nonvolatile memory device 1 using the data line DAT0.

The nonvolatile memory device 1 of the present embodiment may stop outputting the boot code in all of the processes shown in FIG. 3, or may stop outputting the boot code in only one (or two) of the processes shown in FIG. 3.

In the process shown in FIG. 3(c), the nonvolatile memory device 1 may output the entire boot code data to the host device 2, or may determine the standardized size of output data in advance, and may output boot code data having the determined size. Alternatively, the host device 2 may set the size of output data when writing the boot code to the nonvolatile memory device 1.

1.2.3 Format of First Symbol and Second Symbol

The format of a first symbol transmitted from the host device 2 to the nonvolatile memory device 1 in the memory system 1000 and the format of a second symbol transmitted from the nonvolatile memory device 1 to the host device 2 in the memory system 1000 will now be described.

Figure 7:
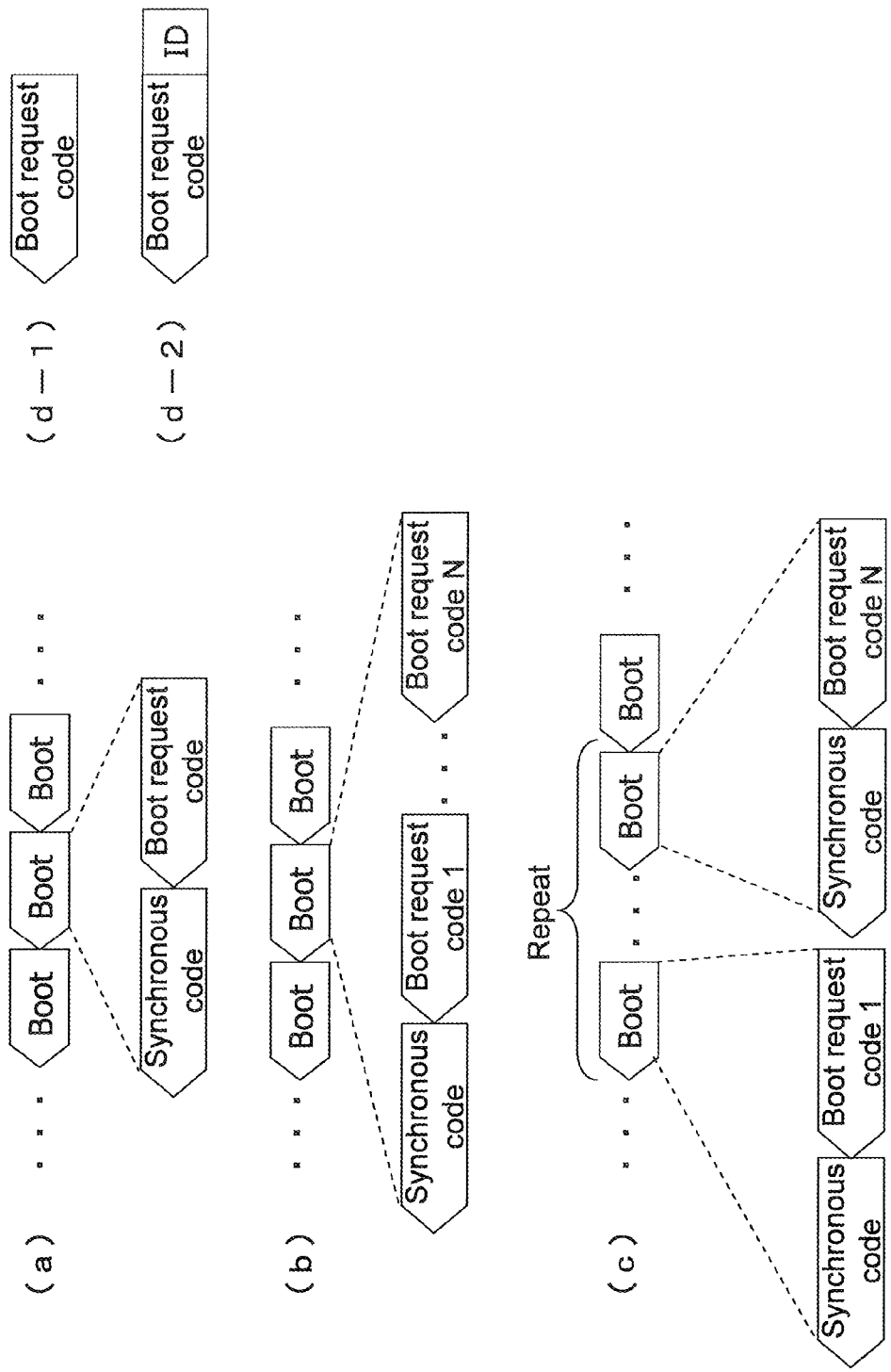

FIG. 7 is a diagram describing the format of the first symbol and the second symbol that are transmitted by the host device 2 and the nonvolatile memory device 1 in the present embodiment.

As shown in FIG. 7, each of the first symbol and the second symbol used in the present embodiment contains a synchronous code.

In the example shown in FIG. 7(a), each of the first symbol and the second symbol consists of two codes: a synchronous code such as a comma code, and a boot request code. The boot request code may be a code obtained through 8b-10b conversion. For example, the boot request code may be a K code, or may be a D code obtained by converting any of the codes 0x0 to 0xFF through 8b-10b conversion. A freely selected code with which the nonvolatile memory device 1 can identify an instruction for reading a boot code can be used as the boot request code.

In the example shown in FIG. 7(b), each of the first symbol and the second symbol consists of a synchronous code and N boot request codes (N is a natural number). The boot request codes 1 to N may be different codes, or may be the same codes. The boot request codes 1 to N may be K codes, or may be D codes obtained by converting any of the codes 0x0 to 0xFF through 8b-10b conversion.

In the example shown in FIG. 7(c), each of the first symbol and the second symbol consists of a synchronous code and a boot request code. As shown in FIG. 7(c), a plurality of codes 1 to N are used as the boot request codes. The first symbol and the second symbol each of which contains a different one of the boot request codes 1 to N are transmitted. The boot request codes 1 to N may be different codes, or may be the same codes. The boot request codes 1 to N may be K codes, or may be D codes obtained by converting any of the codes 0x0 to 0xFF through 8b-10b conversion.

As described above, a synchronous code is added to the first symbol and the second symbol to enable the host device 2 and the nonvolatile memory device 1 to synchronize a signal (data) transmitted using the data line DAT0 and a signal (data) transmitted using the data line DAT1 to correctly receive signals (data) transmitted using the data line DAT1 in the boot code reading process.

In any of the examples shown in FIG. 7, the first symbol and the second symbol may be repeatedly transmitted a predetermined number of times. More specifically, the host device 2 may repeatedly transmit the first symbol to the nonvolatile memory device 1 until at least the nonvolatile memory device 1 starts outputting the boot code. After receiving the first symbol from the host device 2, the nonvolatile memory device 1 may repeatedly transmit the second symbol until transmitting the boot code to the host device 2. The boot request code may be a single code as shown in FIG. 7(d-1), or may be a code including an identifier ID as shown in FIG. 7(d-2).

1.2.4 Data Output Method

A method with which the nonvolatile memory device 1 transmits a boot code using the data line DAT1 in the memory system 1000 (data output method) will now be described.

Figure 4:
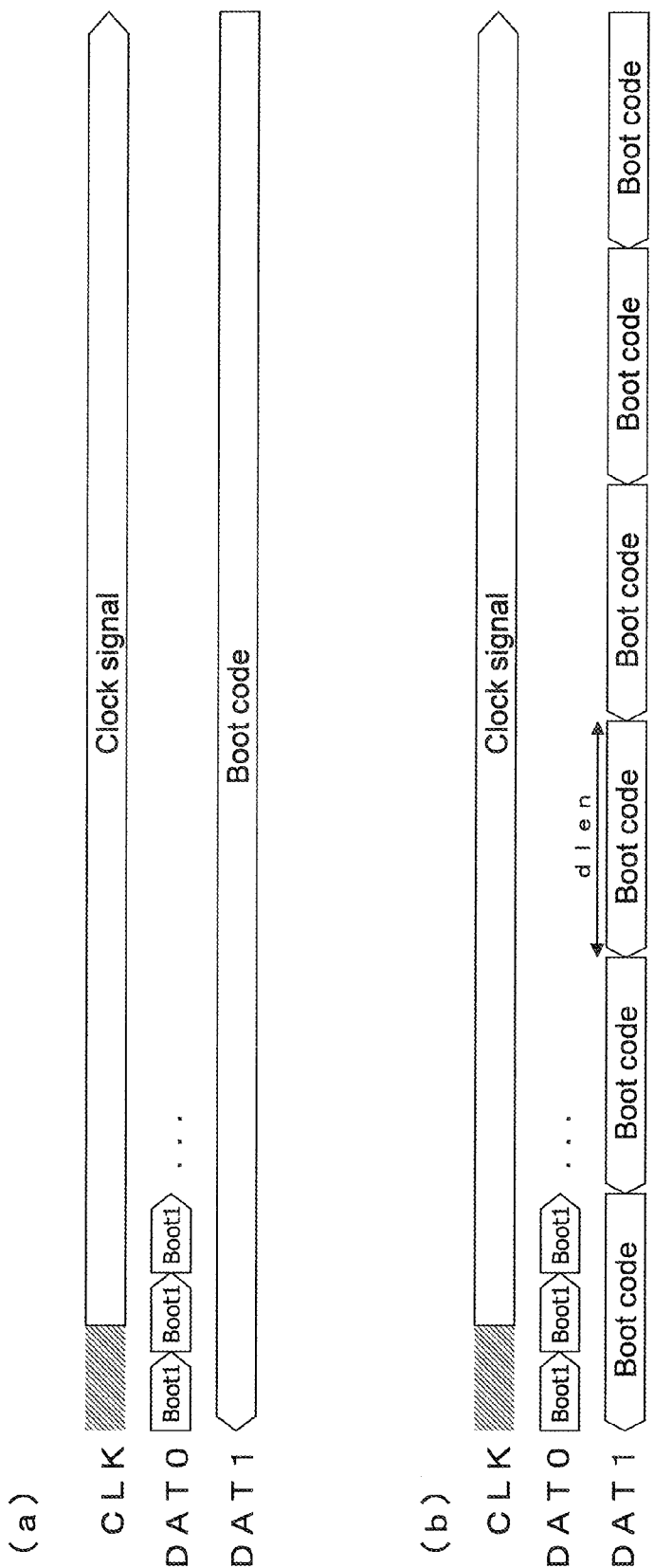
FIGS. 4A and 4B are diagrams describing the data format of a boot code used in the memory system according to the first embodiment.

FIG. 4 is a diagram describing a method with which the nonvolatile memory device 1 transmits a boot code to the host device 2 using the data line DAT1.

FIG. 4(a) shows transmission of a boot code from the nonvolatile memory device 1 to the host device 2 performed continuously without dividing the code. FIG. 4(b) shows transmission of a boot code from the nonvolatile memory device 1 to the host device 2 performed by dividing the code in units of a predetermined length dlen. The nonvolatile memory device 1 of the present embodiment may transmit a boot code with any of the methods shown in FIG. 4, or may transmit a boot code using the two methods. When the nonvolatile memory device 1 can transmit the code using the two methods, the host device 2 designates one of the methods shown in FIG. 4 with which the nonvolatile memory device 1 uses to transmit the code.

The block length dlen may be, for example, 512 bytes or 1 kilobyte, and may be a standardized fixed value, or may be preset by the host device 2 as a value to be used by the nonvolatile memory device 1. When the host device 2 presets the data output method or the block length, the nonvolatile memory device 1 stores the set information in its nonvolatile area.

Figure 10:
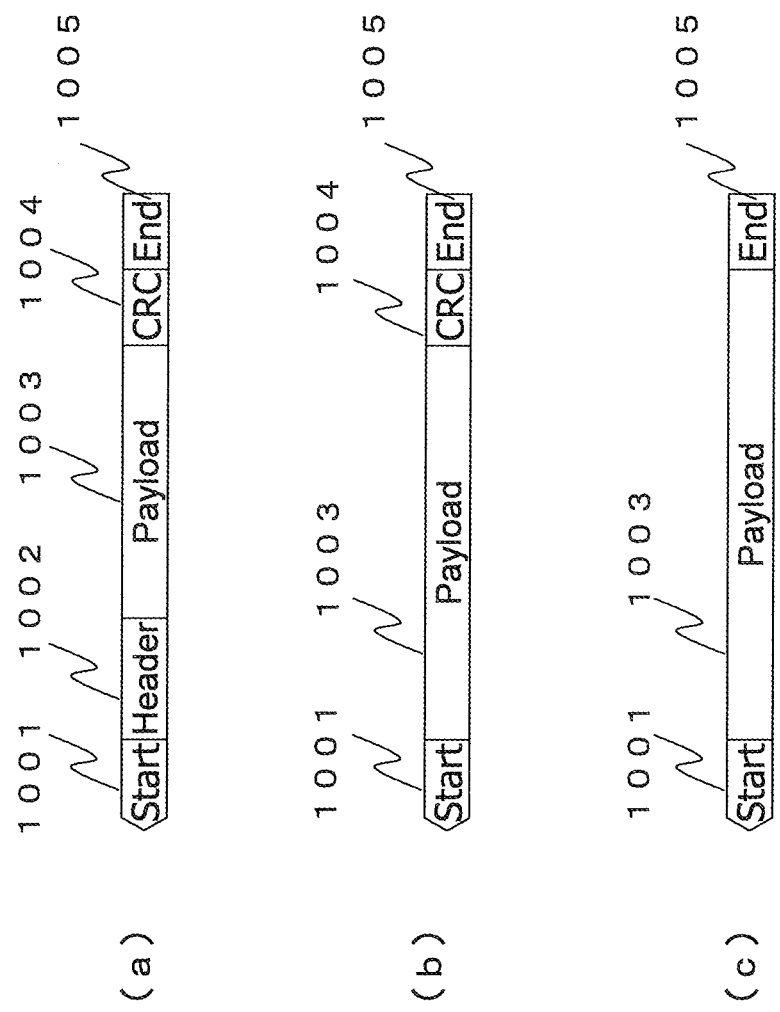
FIGS. 10A to 10C are diagrams describing the data format of the boot code used in the memory system according to the first embodiment.

FIG. 10 is a diagrams describing the format of data output by the nonvolatile memory device 1.

As shown in FIG. 10(a), the data consists of a start symbol 1001, a header 1002, a payload 1003, a CRC 1004, and an end symbol 1005. The start symbol 1001 and the end symbol 1005 contain K codes. The header 1002 stores an ID of a transmission source, an ID of a transmission destination, and a data type. The payload 1003 stores main data. The CRC 1004 is a code used to detect an error occurring on the transmission path of the header 1002 and the payload 1003. The data format may be changed. The data may not include a header as shown in FIG. 10(*b*), or the data may not include a header and a CRC and may simply consist of a start symbol 1001, a payload 1003, and an end symbol 1005 as shown in FIG. 10(*c*).

As described above with reference to the drawings, the memory system 1000 according to the first embodiment operates in the manner described below. The host device 2 transmits a first symbol to the nonvolatile memory device 1 to cause a boot code to be read. The nonvolatile memory device 1 then transmits a second symbol to the host device 2. When completing the preparations for transmitting a boot code to the host device 2, the nonvolatile memory device 1 outputs the data (transmits the data to the host device 2) following the symbol. In the memory system 1000, the first symbol and the second symbol each contain a synchronous code using a K code, such as a comma code. This enables the host device 2 and the nonvolatile memory device 1 to achieve synchronization and prepare for data reception in the boot code reading process. In the memory system 1000, the host device 2 can read a boot code from the nonvolatile memory device 1 based on a simple mechanism.

Second Embodiment

A second embodiment of the present invention will now be described.

2.1 Topologies Used to Connect Host Device and Nonvolatile Memory Devices

Figure 5:
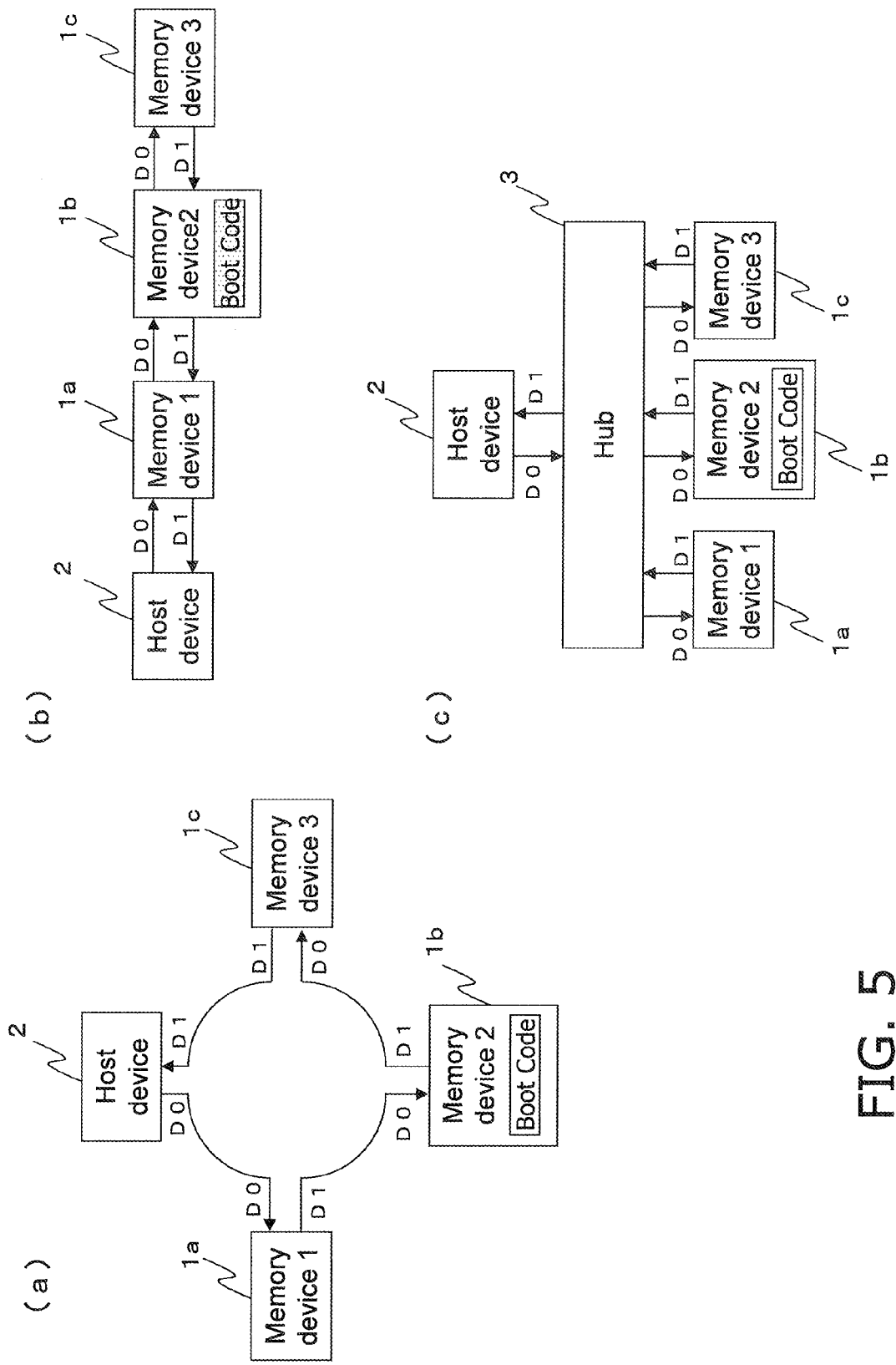
FIGS. 5A to 5C are diagrams describing topologies used to connect a host device and nonvolatile memory devices in a memory system according to a second embodiment of the present invention.

FIG. 5 is a diagrams describing the topologies used to connect the host device 2 and the nonvolatile memory devices 1*a* to 1*c* in the memory system according to the second embodiment. FIG. 5(*a*) shows a ring topology, FIG. 5(*b*) shows a chain topology, and FIG. 5(*c*) shows a hub topology using a hub 3. In any of these topologies, the host device 2 transmits data using the signal line DAT0, and receives data using the signal line DAT1. The nonvolatile memory devices 1*a* to 1*c* receive data using the signal line DAT0, and transmit data using the signal line DAT1. Only in the chain topology shown in FIG. 5(*b*), each nonvolatile memory device has an output for the signal line DAT0, which enables signal transmission to and from its subsequent nonvolatile memory device (an output terminal for outputting data to the signal line DAT0 (an output interface) and an input for the signal line DAT1 (an input terminal for inputting data from the signal line DAT0) (an input interface)).

Although FIG. 5 does not show the clock line CLK, the host device and the nonvolatile memory devices may be connected using their independent terminals connected to the clock line CLK. Alternatively, a clock signal may be provided from the host device to the nonvolatile memory devices using an embedded clock. In addition to the nonvolatile memory devices, various network devices including WLAN and I/O devices may be connected to the memory system. The number of such devices connected to this system should not be limited to a particular number. For ease of explanation, the nonvolatile memory device 1*b* stores a boot code.

2.2 Boot Code Reading Sequence

A boot code reading sequence used in the memory system of the present invention will now be described.

2.2.1 Boot Code Reading Sequence for Ring Topology

A boot code reading sequence used when the memory system has a ring topology will now be described.

Figure 6A:
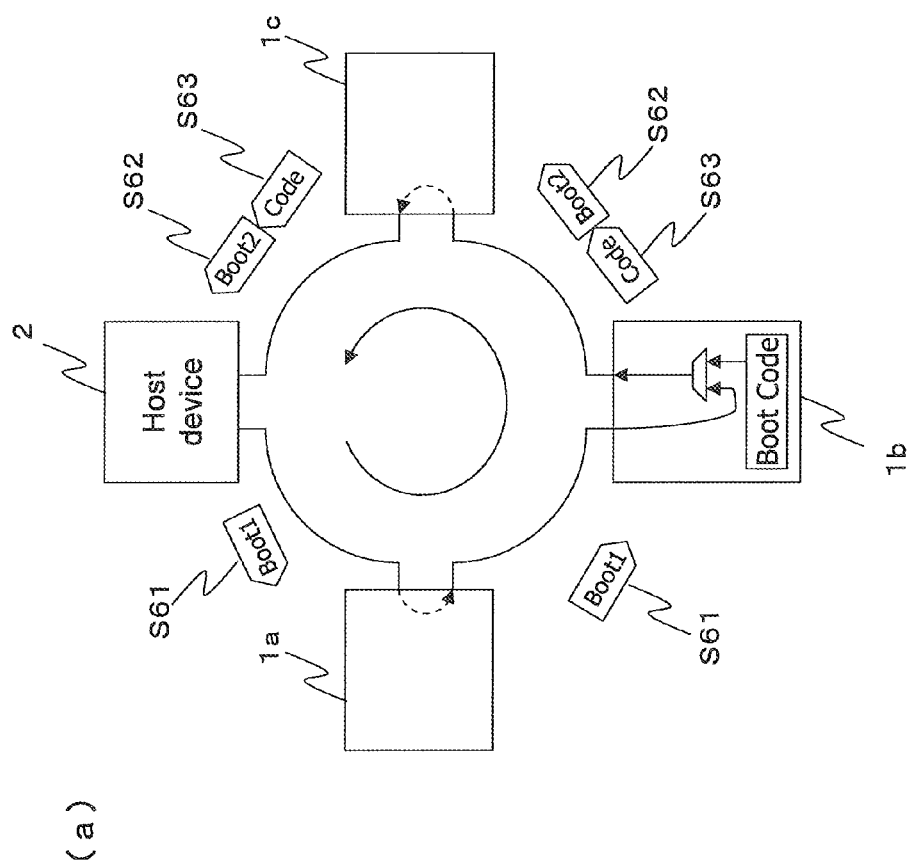
FIGS. 6A-A is a diagram describing a boot code reading sequence used in the memory system of the second embodiment having a ring topology in which the host device and the nonvolatile memory devices are connected in a ring.

FIG. 6A(a) is a diagram describing a boot code reading sequence used when the memory system of the present embodiment has a ring topology in which the host device 2 and the nonvolatile memory devices 1*a* to 1*c* are connected in a ring.

As shown in FIG. 6A(a), the host device 2 first transmits an IF activating signal to activate an interface (IF), and then transmits a first symbol S61 containing a synchronous code to the nonvolatile memory devices. The first symbol S61 is specifically one of the codes described above with reference to FIG. 7.

The nonvolatile memory device 1*a* stores no boot code, and thus transmits the received first symbol S61 to the subsequent device (nonvolatile memory device 1*b*) without changing the received symbol.

The nonvolatile memory device 1*b* receives the first symbol S61 from the nonvolatile memory device 1*a*, and transmits a second symbol S62 (to the nonvolatile memory device 1*c*). When completing the preparations for outputting a boot code, the nonvolatile memory device 1*b* outputs a boot code S63 (to the nonvolatile memory device 1*c*) following the symbol.

The nonvolatile memory device 1*c* stores no boot code, and thus transmits the second symbol S62 and the boot code S63 received from the nonvolatile memory device 1*b* to the host device 2 without changing the received symbol and code.

In the memory system of the present embodiment (with a ring topology), the host device 2 receives the second symbol S62 and the boot code S63 transmitted from the nonvolatile memory device 1*b* and performs the system boot-up process in the manner described above.

Although FIG. 6A(a) shows only the single first symbol S61 and the single second symbol S62, these symbols are actually transmitted repeatedly to perform the same sequence as the sequence described with reference to FIGS. 2A and 2B. The processing performed to stop the boot code transmission and the data format are the same as those described with reference to FIG. 3, FIG. 4, and FIG. 10.

2.2.2 Chain Topology

A boot code reading sequence used when the memory system of the present embodiment has a chain topology will now be described.

Figure 6B:
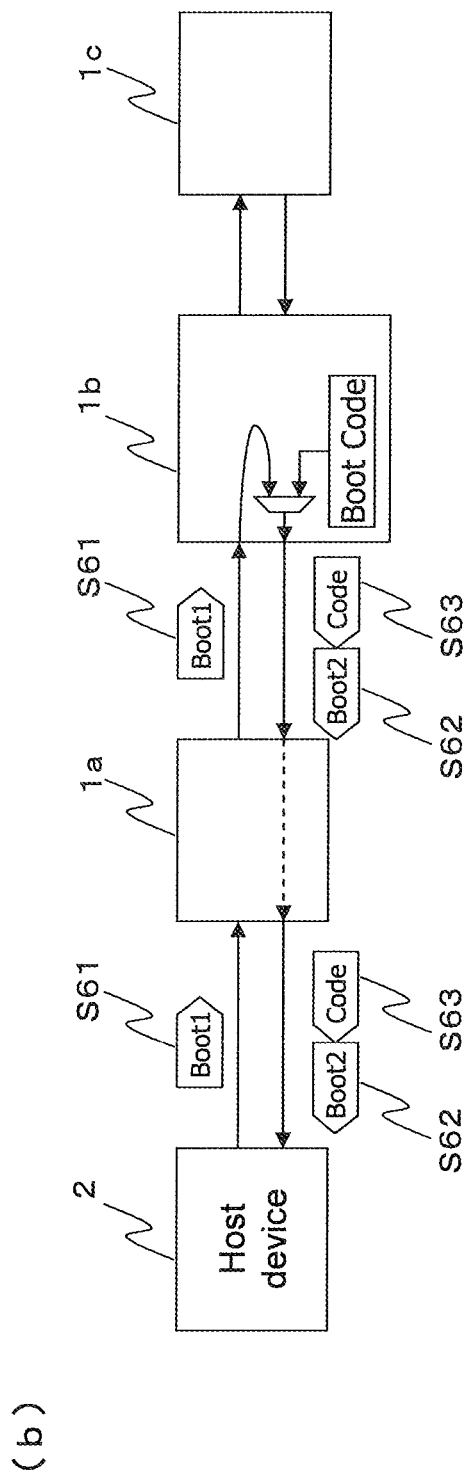
FIGS. 6B-B is a diagram describing a boot code reading sequence used in the memory system of the second embodiment having a chain topology in which the host device and the nonvolatile memory devices are connected in a chain.

FIG. 6B(b) is a diagram describing a boot code reading sequence used when the memory system of the present embodiment has a chain topology in which the host device 2 and the nonvolatile memory devices 1*a* to 1*c* are connected in a chain.

As shown in FIG. 6B(b), the host device 2 first transmits an IF activating signal to activate an interface (IF), and then transmits a first symbol S61 to the nonvolatile memory device 1*a*. The first symbol S61 is specifically one of the codes described above with reference to FIG. 7.

The nonvolatile memory device 1*a* stores no boot code, and thus transmits the first symbol S61 received from the host device 2 to the subsequent device (nonvolatile memory device 1*b*) without changing the received symbol.

The nonvolatile memory device 1*b* receives the first symbol S61 from the nonvolatile memory device 1*a*, and transmits a second symbol S62 to the nonvolatile memory device 1*a*. When completing the preparations for outputting a boot code, the nonvolatile memory device 1*b* outputs a boot code S63 to the nonvolatile memory device 1*a* following the symbol. In this case, the nonvolatile memory device 1*b* does not transmit the second symbol and the boot code to the nonvolatile memory device 1*c*.

The nonvolatile memory device 1*a* transmits the second symbol S62 and the boot code S63 received from the nonvolatile memory device 1*b* to the host device 2 without changing the symbol and the code.

In the memory system of the present embodiment (using a chain topology), the host device 2 receives the second symbol S62 and the boot code S63 transmitted from the nonvolatile memory device 1*b* and performs the system boot-up process in the manner described above.

Although FIG. 6B(b) shows only the single first symbol S61 and the single second symbol S62, the symbols are actually transmitted repeatedly in the same manner as described with reference to FIGS. 2A and 2B. The processing performed to stop the boot code transmission and the data format are the same as those described with reference to FIG. 3, FIG. 4, and FIG. 10.

2.2.3 Hub Topology

A boot code reading sequence used when the memory system of the present embodiment has a hub topology will now be described.

Figure 6C:
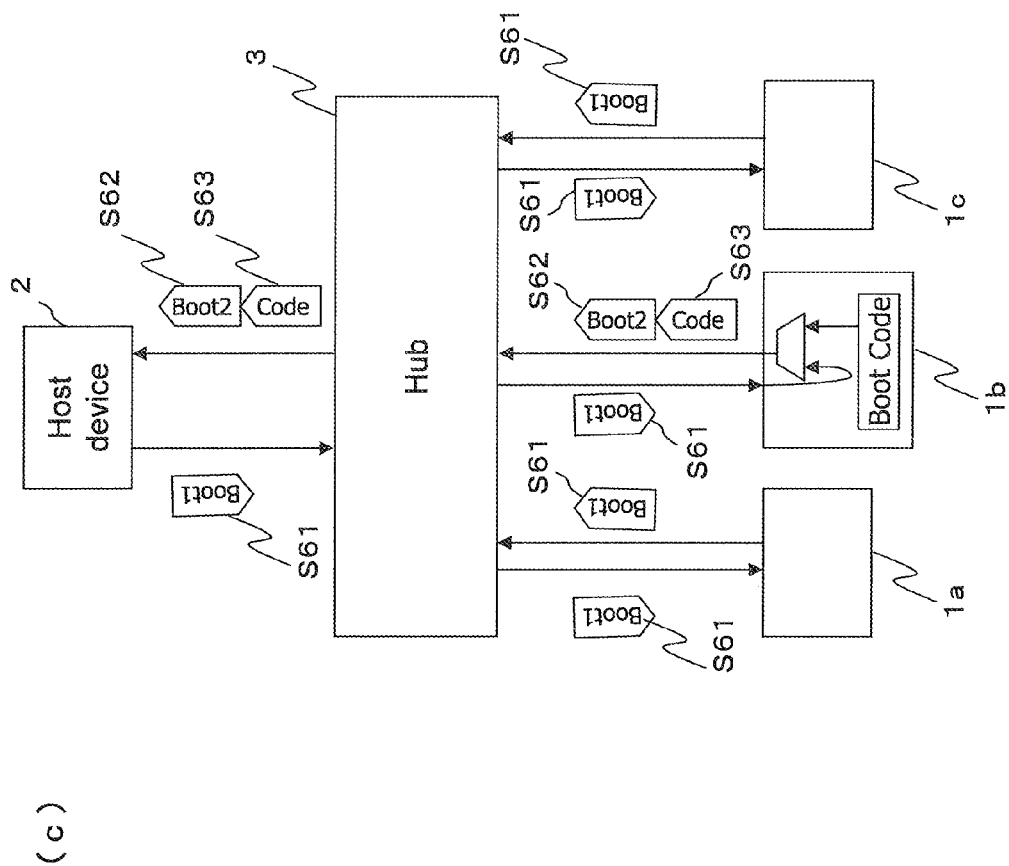
FIGS. 6C-C is a diagram describing a boot code reading sequence used in the memory system of the second embodiment having a hub topology in which the host device and the nonvolatile memory devices are connected using a hub.

FIG. 6C(c) is a diagram describing a boot code reading sequence used when the memory system of the present embodiment has a hub topology in which the host device 2 and the nonvolatile memory devices 1*a* to 1*c* are connected using a hub 3.

As shown in FIG. 6C(c), the host device 2 first transmits an IF activating signal to the nonvolatile memory devices via the hub 3 to activate an interface (IF), and then transmits a first symbol S61 to the nonvolatile memory devices via the hub. The first symbol S61 is specifically one of the codes described above with reference to FIG. 7.

The hub 3 transmits the first symbol S61 received from the host device 2 to the nonvolatile memory devices 1*a* to 1*c*.

The nonvolatile memory devices 1*a* and 1*c* store no boot code, and thus transmit the first symbol S61 received from the hub 3 to the hub 3 without changing the received symbol.

The nonvolatile memory device 1*b* receives the first symbol S61, and transmits a second symbol S62 to the hub 3. When completing the preparations for outputting a boot code, the nonvolatile memory device 1*b* outputs a boot code S63 to the hub 3 following the symbol.

The hub 3 transmits the second symbol S62 and the boot code S63 received from the nonvolatile memory device 1*b* to the host device 2.

In the memory system of the present embodiment (using a hub topology), the host device 2 receives the second symbol S62 and the boot code S63 transmitted from the nonvolatile memory device 1*b* and performs the system boot-up process in the manner described above.

Although FIG. 6C(c) shows only the single first symbol and the single second symbol, the symbols are actually transmitted repeatedly in the same manner as described with reference to FIGS. 2A and 2B. The processing performed to stop the boot code transmission and the data format are the same as those described with reference to FIG. 3, FIG. 4, and FIG. 10.

Although the nonvolatile memory devices 1*a* and 1*c* storing no boot code output the received first symbol without changing the symbol in FIG. 6C(c), the present invention should not be limited to this method. Alternatively, for example, the nonvolatile memory devices storing no boot code may output no symbol after receiving the first symbol. Alternatively, a port connected to a nonvolatile memory device storing a boot code may be set in advance in the hub 3. The hub 3 may then transmit a first symbol received from the host device 2 only to the nonvolatile memory device storing a boot code based on the designated port.

Figure 11:
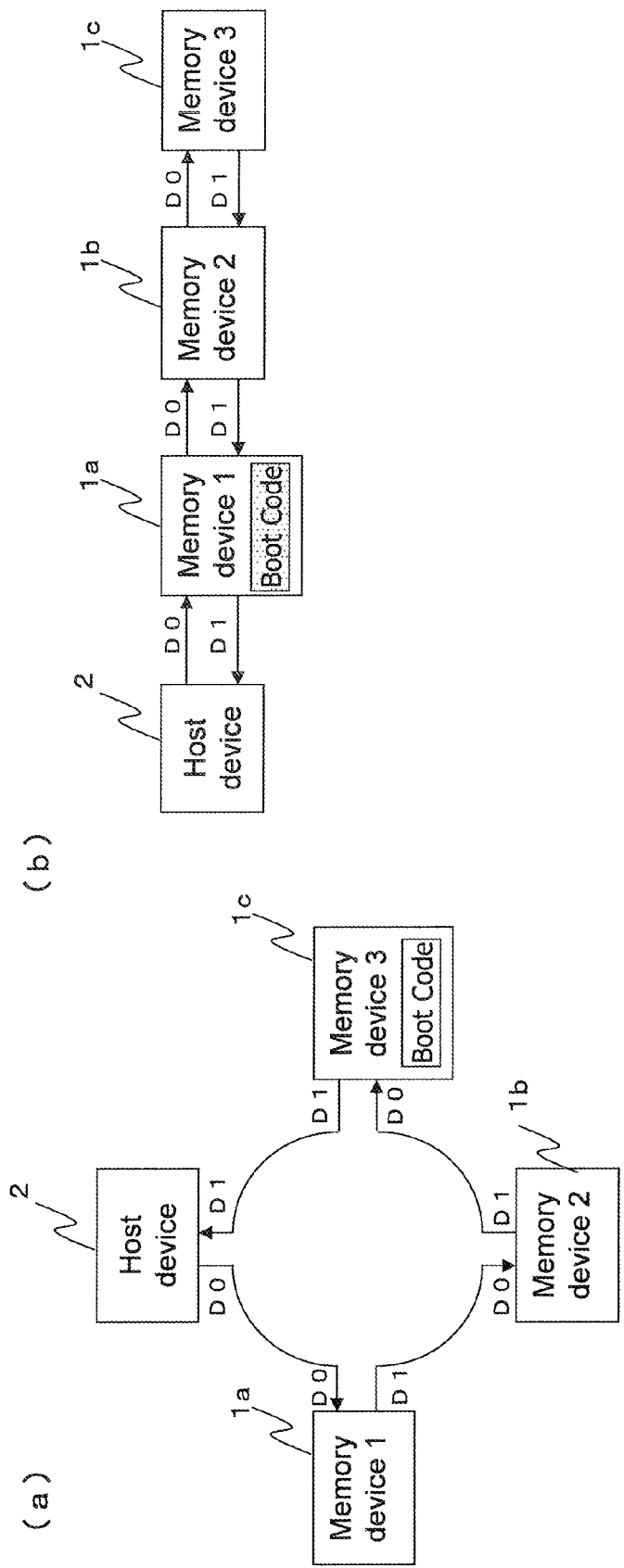
FIGS. 11A and 11B are diagrams each describing the position at which the memory device storing the boot code is connected in the memory system according to the first embodiment.

Although the nonvolatile memory device 1*b* stores a boot code in FIGS. 6A and 6B, it is preferable that the nonvolatile memory device nearest the reception terminal of the host device 2 (the input terminal of the signal line DAT1 (input interface)) (the nonvolatile memory device 1*c* in FIG. 11(*a*) or the nonvolatile memory device 1*a* in FIG. 11(*b*)) stores a boot code when the memory system uses a ring topology or a chain topology. In a ring topology, it is preferable that the nonvolatile memory device 1*c* stores a boot code as shown in FIG. 11(*a*). In a chain topology, it is preferable that the nonvolatile memory device 1*a* stores a boot code as shown in FIG. 11(*b*). In this case, the second symbol and the boot code to be received by the host device are transmitted on the shortest transmission path. This increases the signal quality in the memory system.

As described above with reference to the drawings, the memory system according to the second embodiment operates in the manner described below. The host device transmits a first symbol to cause a boot code to be read. As a result, (1) the nonvolatile memory device storing no boot code transmits the received first symbol, the received second symbol, or the received boot code data without changing. (2) The nonvolatile memory device storing a boot code first transmits the second symbol, and then when completing the preparations for transmitting a boot code, the nonvolatile memory device outputs the boot code data following the symbol. In this memory system according to the second embodiment, the host device and the nonvolatile memory devices can operate in the same manner as the host device and the nonvolatile memory devices according to the first embodiment in any of the topologies: a ring topology, a chain topology, and a hub topology. As a result, the memory system of the second embodiment enables the host device to read a boot code from a nonvolatile memory device in an efficient manner based on a simple mechanism in any topology selected to connect the host device and the plurality of nonvolatile memory devices.

Third Embodiment

A third embodiment of the present invention will now be described.

Figure 8A:
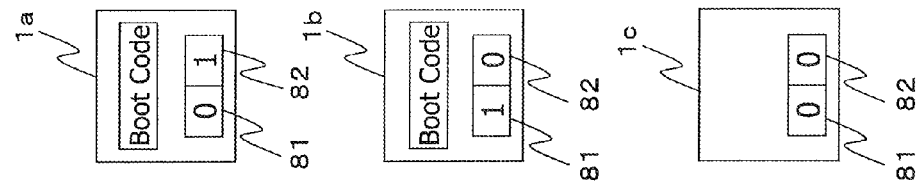
FIG. 8A-A is a diagram describing a boot device flag stored in a nonvolatile memory device in the third embodiment.
Figure 8B:
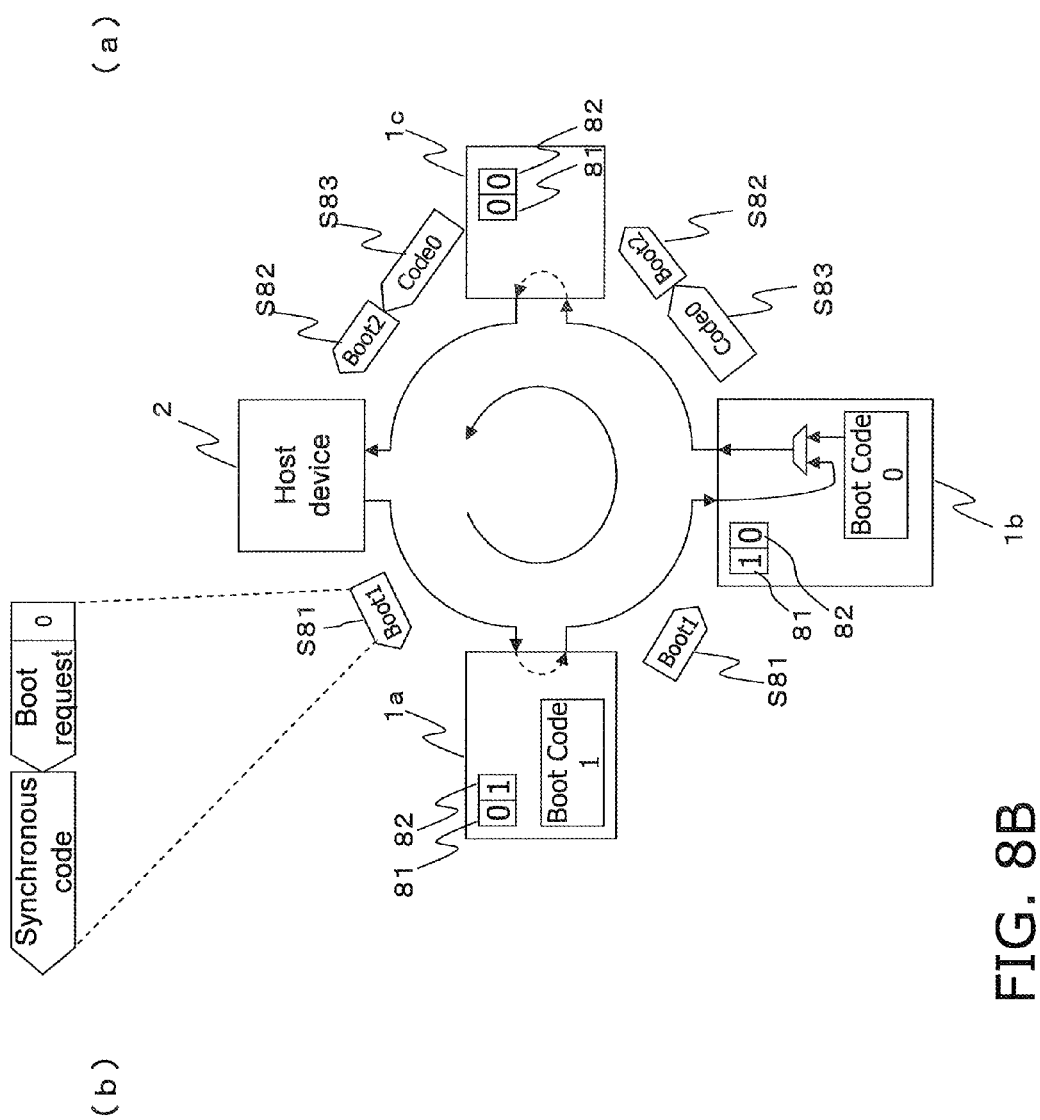
FIG. 8B-B is a diagram describing a boot code reading sequence (when an ID of a boot request code is 0) used in the memory system according to the third embodiment.
Figure 8C:
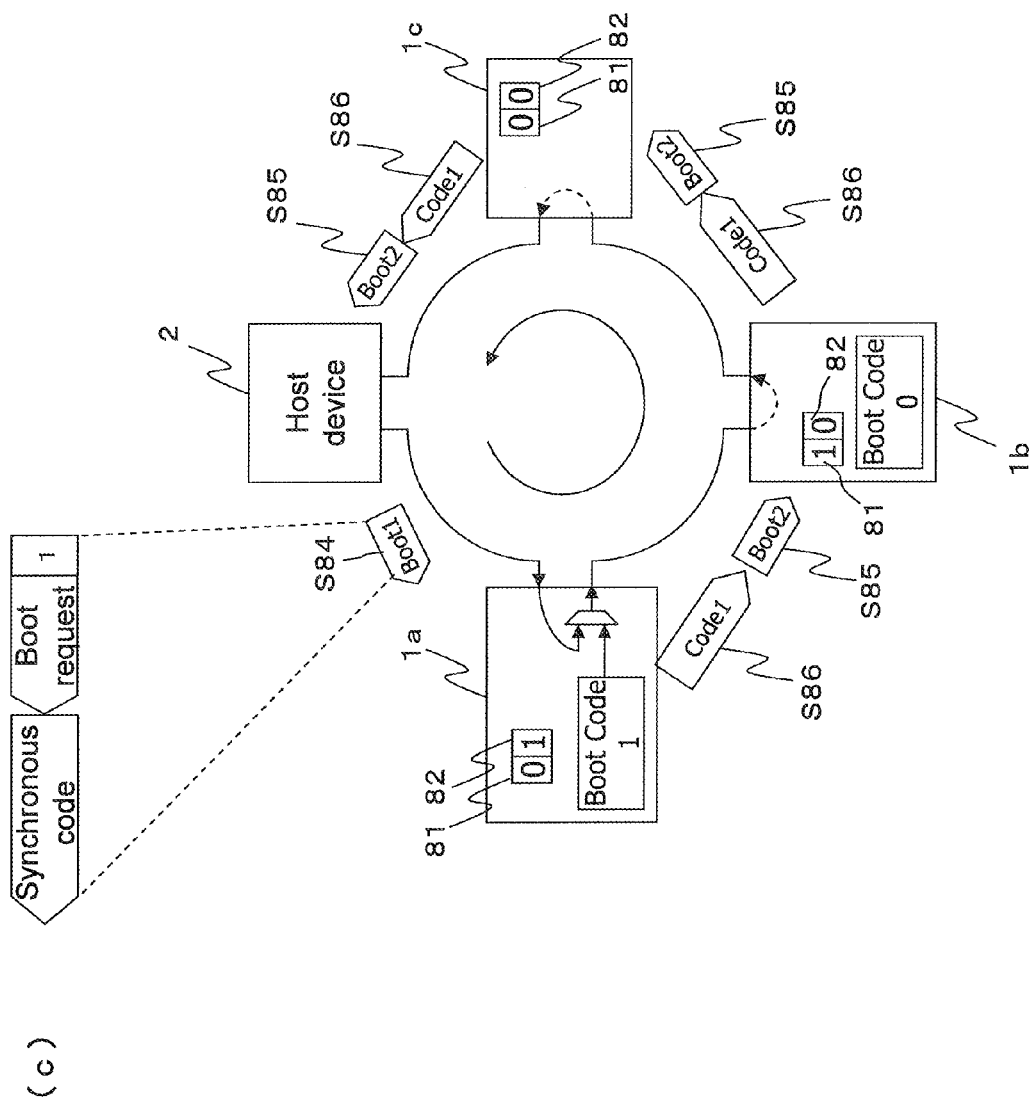
FIG. 8C-C is a diagram describing a boot code reading sequence (when an ID of a boot request code is 1) used in the memory system according to the third embodiment.

FIG. 8A is a diagram describing the operation of the host device 2 and the nonvolatile memory devices 1*a* to 1*c* in the memory system according to the third embodiment. In FIGS. 8A to 8C, the nonvolatile memory devices 1*a* and 1*b* each store a boot code.

3.1 Structure of Nonvolatile Memory Devices

The structure of the nonvolatile memory devices included in the memory system according to the present embodiment will now be described.

FIG. 8A(a) is a diagram describing the structure of the nonvolatile memory devices according to the present embodiment.

As shown in FIG. 8A(a), each of the nonvolatile memory device 1*a* to 1*c* has a first boot device flag 81 and a second boot device flag 82.

The nonvolatile memory device 1*a* has the second boot device flag 82 set at 1. The nonvolatile memory device 1*b* has the first boot device flag 81 set at 1. The nonvolatile memory device 1*c* stores no boot code, and has the first boot device flag and the second boot device flag both set at 0. These flags are used to identify a nonvolatile memory device that is required to transmit a boot code when a plurality of nonvolatile memory devices store a boot code. The flags should not be limited to these two flags, but may be flags corresponding in one-to-one to the devices that store a boot code in the memory system. Also, the flags should not be limited to single-bit flags. For example, a 4-bit flag may be used to identify 16 nonvolatile memory devices at maximum. The 4-bit flag may then be used to identify nonvolatile memory devices that store a boot code. For example, 16 codes ID0x0 to ID0xF (IDs each expressed using a 4-bit flag) may be respectively allocated to 16 nonvolatile memory devices #0 to #15. To read, for example, a boot code from the nonvolatile memory device #2, the boot request code may be set to 0x2 so that the boot code is read from the nonvolatile memory device #2. The flag is predetermined nonvolatile information, which may be stored in the nonvolatile memory 12 or other memories such as a ROM or an EEPROM in the nonvolatile memory device. Alternatively, the flag may be set using a terminal.

3.2 Structure of Boot Request Code

The boot request code used in the present embodiment will now be described.

FIG. 7(*d*-2) is a diagram describing a boot request code included in a first symbol transmitted from the host device according to the present embodiment. In FIG. 7(*d*-2), the first symbol is expressed using a D-code, and includes an identifier ID.

3.3 Boot Code Reading Sequence

A boot code reading sequence used in the memory system of the present embodiment will now be described.

FIGS. 8B(b) and 8C(c) are diagrams describing a boot code reading sequence used in the memory system of the present embodiment.

The sequence shown in FIG. 8B(b) will first be described.

As shown in FIG. 8B(b), the host device 2 transmits a first symbol S81 to the nonvolatile memory device 1*a*. The ID included in the boot request code is set at 0, which indicates the first boot device. In this case, the nonvolatile memory device 1*b* whose first boot device flag is set at 1 transmits a boot code S83, following the second symbol S82, as shown in FIG. 8B(b).

The nonvolatile memory devices 1*a* and 1*c* whose first boot device flag is set at 0 transmit the received first symbol S81, the received second symbol S82, and the received boot code S83 without changing.

The sequence shown in FIG. 8C(c) will now be described.

As shown in FIG. 8C(c), the host device 2 transmits a first symbol S84 to the nonvolatile memory device 1*a*. The ID included in the boot request code is set at 1, which indicates the second boot device. In this case, the nonvolatile memory device 1*b* whose second boot device flag is set at 1 transmits a boot code S86, following the second symbol S85, as shown in FIG. 8C(c).

The nonvolatile memory devices 1*b* and 1*c* whose second boot device flag is set at 0 transmit the received second symbol S85 and the received boot code S86 without changing.

As described above with reference to the drawings, the memory system according to the third embodiment operates in the manner described below. When the host device transmits a first symbol, the host device transmits a boot request code in which an ID is set. Each nonvolatile memory device determines whether the ID included in the boot request code matches the set value of its boot device flag. (1) When determining that the ID and the set boot device flag match, the nonvolatile memory device transmits a boot code stored in the device. (2) In any other cases, the nonvolatile memory device transmits the received first symbol, the received second symbol, and the received boot code without changing.

In the memory system of the present embodiment, the host device can read a boot code from a designated one of the plurality of nonvolatile memory devices each storing a boot code. Each of the nonvolatile memory devices storing a boot code has a boot device flag. The host device is simply required to add, to a first symbol, an ID of the nonvolatile memory device to be designated. The memory system of the present embodiment in which the host device and the plurality of nonvolatile memory devices may be connected to each other enables the host device to read a boot code from a nonvolatile memory device based on a simple mechanism.

Other Embodiments

Although the embodiments of the present invention have been described with reference to the drawings, the specific structures of the present invention should not be limited to the above embodiments, but may be modified variously without departing from the scope and the spirit of the invention. For example, the first symbol and the second symbol may be any codes containing a synchronous code. Such codes containing a synchronous code can function as boot request codes, which can cause the nonvolatile memory devices to read a boot code.

In the memory system, the number of nonvolatile memory devices may be freely selected from one or more. The same processing for reading a boot code can be performed in either a point-to-point topology or in a point-to-multipoint (one to N) topology in which a plurality of nonvolatile memory devices are connected to a single host device. The topologies used to connect a plurality of nonvolatile memory devices should not be limited to the topologies described above, but may be other topologies.

Each block of the host device and the nonvolatile memory devices described in the above embodiments may be formed using a single chip with a semiconductor device, such as LSI (large-scale integration), or some or all of the blocks of the host device and the nonvolatile memory devices may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

All or part of the processes performed by the functional blocks described in the above embodiments may be implemented using programs. All or part of the processes performed by the functional blocks described in the above embodiments is implemented by a central processing unit (CPU) included in a computer. The programs for those processes are stored in a memory device such as a hard disk or a ROM, and are read into a ROM or a RAM and implemented.

The processes described in the above embodiments may be implemented using either hardware or software (which may be combined together with operating system (OS), middleware, or predetermined library), or may be implemented using both software and hardware. When each of the host device and the nonvolatile memory devices of the above embodiments is implemented by hardware, the host device and the nonvolatile memory devices require timing adjustment for their processes. For ease of explanation, the timing adjustment associated with various signals required in an actual hardware design is not described in detail in the above embodiments.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a Blu-ray disc, or a semiconductor memory.

The computer program should not be limited to a program recorded on the recording medium, but may be a program transmitted with an electric communication line, a radio or cable communication line, or a network such as the Internet.

In the above embodiments, the host device and the nonvolatile memory devices are separate devices. However, the present invention should not be limited to this structure. The host device and the nonvolatile memory devices may be incorporated in a single device. The host device may be a host device, and the nonvolatile memory device may be a nonvolatile memory module.

The specific structures described in the above embodiments are mere examples of the present invention, and may be changed and modified variously without departing from the scope and spirit of the invention.

INDUSTRIAL APPLICABILITY

The memory system of the present invention including the host device and the plurality of nonvolatile memory devices, the host device of the present invention, and the nonvolatile memory device of the present invention enable the host device to read a boot code from the nonvolatile memory devices based on a simple mechanism in which the host device and the plurality of nonvolatile memory devices are connected. The present invention is applicable to, for example, a memory system in which a system LSI (large-scale integration) circuit functioning as a host device and a plurality of IO devices or memory devices functioning as nonvolatile memory devices are connected to each other, and enables a boot code to be read in an efficient manner. The present invention is therefore useful and implementable in the field of memory system related technology.

The invention claimed is:

1. A nonvolatile memory device that transmits and receives data to and from a host device, the nonvolatile memory device comprising:
   one or more nonvolatile memories; and
   a controller unit configured to control reading and/or writing of data to and from the nonvolatile memories,
   wherein the controller unit includes a host interface unit and a memory control unit configured to read a boot code of the host device from the nonvolatile memories, and
   (1) when receiving, from the host device, an interface activating signal that is a signal carrying an instruction to activate an interface, the host interface unit transmits an interface activating signal that is identical to the received interface activating signal to the host device,
   (2) when receiving, from the host device, a first symbol carrying an instruction to read the boot code after transmitting the interface activating signal to the host device, the host interface unit transmits a first symbol that is identical to the received first symbol to the host device, and
   (3) after transmitting the first symbol to the host device, the host interface unit outputs the boot code that is read by the memory control unit to the host device.

2. The nonvolatile memory device according to claim 1, wherein
   when receiving the first symbol from the host device, the host interface unit transmits a synchronous symbol that is identical to or differs from the received first symbol to the host device, and
   when receiving an idle symbol from the host device after transmitting the synchronous symbol, the host interface unit transmits an idle symbol to the host device, and
   the controller unit sets a state of the nonvolatile memory device to an idle state after the host interface unit transmits the idle symbol, and
   the host interface unit outputs the boot code that is read by the memory control unit to the host device after the host interface unit transmits the idle symbol and the controller unit sets the state of the nonvolatile memory device to the idle state.

3. The nonvolatile memory device according to claim 2, wherein the host interface unit decodes data transmitted by the host device through 8b-10b conversion when receiving the data transmitted by the host device, and codes data to be transmitted to the host device through 8b-10b conversion when transmitting the data to the host device, and
   (1) when receiving, from the host device, a symbol including a synchronous code as data to be received, the host interface unit synchronizes the data to be received and a clock signal used to receive the data by synchronizing a phase of the data to be received and a phase of the clock signal, and
   (2) when receiving, from the host device, a first symbol including a synchronous code from the host device after synchronizing the clock signal and the data to be received, the host interface unit transmits a first symbol that is identical to the received first symbol to the host device, and after transmitting the first symbol, the host interface unit transmits, to the host device, the boot code that is read by the memory control unit from the nonvolatile memories.

4. The nonvolatile memory device according to claim 3, wherein the host interface unit transmits the received first symbol including the synchronous code without changing the first symbol when the nonvolatile memories included in the nonvolatile memory device store no boot code, and
   the controller unit controls the nonvolatile memory device to be maintained in the idle state when the nonvolatile memories included in the nonvolatile memory device store no boot code and the host interface unit transmits the received first symbol including the synchronous code without changing the first symbol.

5. The nonvolatile memory device according to claim 1, wherein
   the host interface unit stops transmitting the boot code when transmitting data having a predetermined size representing the boot code.

6. The nonvolatile memory device according to claim 1, wherein
   the host interface unit transmits data representing the boot code by dividing the data in units of blocks having a predetermined length.

7. A host device included in a memory system in which the host device transmits and receives data to and from one or more nonvolatile memory devices, the host device comprising:

a controller unit configured to control the entire host device or a part of the host device; and a nonvolatile memory device interface unit, wherein the nonvolatile memory device interface unit (1) transmits an interface activating signal that is a signal carrying an instruction to activate an interface to the nonvolatile memory device, (2) transmits, after transmitting the interface activating signal, a first symbol carrying an instruction generated by the host device to read a boot code to the nonvolatile memory device, and (3) receiving, from the nonvolatile memory device, data that is identical to the first symbol that the nonvolatile memory device interface unit has transmitted to the nonvolatile memory device, and then receives the boot code that is transmitted from the nonvolatile memory device.

8. The host device according to claim 7, wherein when the nonvolatile memory device interface unit transmits the first symbol to the nonvolatile memory device, and when receiving, from the nonvolatile memory device, data that is identical to the transmitted first symbol or data responding to the transmitted first symbol, (1) the nonvolatile memory device interface unit transmits an idle symbol to the nonvolatile memory device, (2) the controller unit sets a state of the host device to an idle state after the nonvolatile memory device interface unit transmits the idle symbol and the controller unit receives the idle symbol from the nonvolatile memory device, and (3) the nonvolatile memory device interface unit receives the boot code after the controller unit sets the state of the host device to the idle state, and transmits status information indicating a reception state of the boot code to the nonvolatile memory device.

9. A memory system in which data is transmitted and received between a host device and one or more nonvolatile memory devices, wherein the host device includes a controller unit configured to control the entire host device or a part of the host device, and a nonvolatile memory device interface unit, and the nonvolatile memory device includes one or more nonvolatile memories and a controller unit configured to control reading and/or writing of data to and from the nonvolatile memories, and the controller unit includes a host interface unit, and a memory control unit configured to read a boot code of the host device from the nonvolatile memories, and (H1) the nonvolatile memory device interface unit transmits an interface activating signal that is a signal carrying an instruction to activate an interface to the nonvolatile memory device, (S1) when the host interface unit receives the interface activating signal from the host device, the host interface unit transmits an interface activating signal that is identical to the received interface activating signal to the host device, (H2) the nonvolatile memory device interface unit transmits, to the nonvolatile memory device, a first symbol carrying an instruction generated by the host device to read the boot code after transmitting the interface activating signal, (S2) when receiving, from the host device, the first symbol carrying the instruction to read the boot code after transmitting the interface activating signal to the host device, the host interface unit transmits a first symbol that is identical to the received first symbol to the host device, (S3) the host interface unit outputs, to the host device, the boot code that is read by the memory control unit after transmitting the first symbol to the host device, and (H3) the nonvolatile memory device interface unit receives the boot code transmitted from the nonvolatile memory device after receiving, from the nonvolatile memory device, data that is identical to the first symbol that the nonvolatile memory device interface unit has transmitted to the nonvolatile memory device.

10. The memory system according to claim 9, wherein (HH1) the nonvolatile memory device interface unit transmits the first symbol to the nonvolatile memory device, (SS1) when receiving the first symbol from the host device, the host interface unit transmits a synchronous symbol that is identical to or differs from the received first symbol to the host device, (HH2) when receiving, from the nonvolatile memory device, data that is identical to the transmitted first symbol or data responding to the transmitted first symbol, the nonvolatile memory device interface unit transmits an idle symbol to the nonvolatile memory device, (HH3) the controller unit included in the host device sets a state of the host device to an idle state after the nonvolatile memory device interface unit transmits the idle symbol, and (SS2) when receiving the idle symbol from the host device after transmitting the synchronous symbol to the host device, the host interface unit transmits an idle symbol to the host device, and (SS3) the controller unit included in the nonvolatile memory device sets a state of the nonvolatile memory device to an idle state after the host device interface unit transmits the idle symbol.

11. The memory system according to claim 10, wherein the host interface unit outputs, to the host device, the boot code that is read by the memory control unit after the host interface unit transmits the idle symbol and the controller unit sets the state of the nonvolatile memory device to the idle state, and the nonvolatile memory device interface unit receives the boot code after the nonvolatile memory device interface unit transmits the idle symbol and the controller unit sets the state of the host device to the idle state, and transmits status information indicating a reception state of the boot code to the nonvolatile memory device.

12. The memory system according to claim 9, wherein the nonvolatile memory device stops transmitting the boot code when transmitting data having a predetermined size representing the boot code, and the host device determines that the boot code transmission performed by the nonvolatile memory device is stopped when receiving data having the predetermined size representing the boot code.

13. The memory system according to claim 9, wherein the host device receives data representing the boot code when the nonvolatile memory device transmits the data representing the boot code in units of blocks having a predetermined length.

14. The memory system according to claim 9, wherein the received first symbol includes a synchronous code, and the nonvolatile memory device transmits the received first symbol including the synchronous code without changing the first symbol when storing no boot code, and when the host device receives no data representing the boot code after transmitting the first symbol including the synchronous code a predetermined number of times or for a predetermined period of time, the host device determines that the nonvolatile memory device stores no boot code.

15. The memory system according to claim 9 wherein the first symbol includes a boot device identifier and a synchronous code, and
the host device sets the boot device identifier in the first symbol including the synchronous code, the boot device identifier identifying the nonvolatile memory device from which the boot code is to be output, and transmits the first symbol in which the boot device identifier has been set, and
the nonvolatile memory device includes a storage unit storing first boot device flag information and second boot device flag information, and
when receiving the first symbol including the synchronous code, the nonvolatile memory device determines whether the boot code is to be transmitted based on the boot device identifier set in the received first symbol including the synchronous code.

16. The memory system according to claim 9, wherein the host device and the one or more nonvolatile memory devices are connected using a ring topology.

17. The memory system according to claim 9, wherein the host device and the one or more nonvolatile memory devices are connected using a hub topology.

18. A data communication method for performing data communication between a host device and one or more nonvolatile memory devices, the host device including a controller unit configured to control the entire host device or a part of the host device and a nonvolatile memory device interface unit, the nonvolatile memory device including one or more nonvolatile memories, a host interface unit, and a controller unit configured to control reading and/or writing of data to and from the nonvolatile memories, the controller unit including a memory control unit configured to read a boot code of the host device from the nonvolatile memories, the method comprising:
(H1) transmitting, using the nonvolatile memory device interface unit, an interface activating signal that is a signal carrying an instruction to activate an interface to the nonvolatile memory device;
(S1) transmitting, using the host interface unit, an interface activating signal that is identical to the interface activating signal to the host device when the host interface unit receives the interface activating signal from the host device;
(H2) transmitting, using the nonvolatile memory device interface unit, to the nonvolatile memory device, a first symbol carrying an instruction generated by the host device to read the boot code after the nonvolatile memory device interface unit transmits the interface activating signal;
(S2) transmitting, using the host interface unit, a first symbol that is identical to the first symbol to the host device when receiving, from the host device, the first symbol carrying an instruction to read the boot code after transmitting the interface activating signal to the host device;
(S3) outputting, using the host interface unit, the boot code that is read by the memory control unit to the host device after transmitting the first symbol to the host device; and
(H3) receiving, using the nonvolatile memory device interface unit, the boot code that is transmitted by the nonvolatile memory device after receiving, from the nonvolatile memory device, data that is identical to the first symbol that is transmitted to the nonvolatile memory device.

19. A non-transitory computer-readable storage medium storing a program enabling a computer to implement the data communication method according to claim 18.

* * * * *